United States Patent
Yamada et al.

(10) Patent No.: US 10,817,000 B2
(45) Date of Patent: Oct. 27, 2020

(54) UNMANNED AERIAL VEHICLE AND CONTROL METHOD OF UNMANNED AERIAL VEHICLE

(71) Applicant: FUJITSU LIMITED, Kawasaki-shi, Kanagawa (JP)

(72) Inventors: Moyuru Yamada, Machida (JP); Yoshiro Hada, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 333 days.

(21) Appl. No.: 15/653,915

(22) Filed: Jul. 19, 2017

(65) Prior Publication Data

US 2018/0074517 A1 Mar. 15, 2018

(30) Foreign Application Priority Data

Sep. 13, 2016 (JP) .................................. 2016-178977

(51) Int. Cl.
*G05D 1/10* (2006.01)
*B64C 37/00* (2006.01)
(Continued)

(52) U.S. Cl.
CPC ............. *G05D 1/101* (2013.01); *B64C 37/00* (2013.01); *B64C 39/02* (2013.01); *B64C 39/024* (2013.01);
(Continued)

(58) Field of Classification Search
CPC ...... G05D 1/101; G05D 1/0022; B64C 37/00; B64C 39/02; B64C 39/024;
(Continued)

(56) References Cited

U.S. PATENT DOCUMENTS

2010/0012776 A1 * 1/2010 Hursig .................... B64C 27/20
244/81
2014/0319266 A1 * 10/2014 Moschetta .............. B64C 25/36
244/13
(Continued)

FOREIGN PATENT DOCUMENTS

JP 2007-331426 12/2007
JP 2008-290704 12/2008
(Continued)

OTHER PUBLICATIONS

English Translation: Ishibashi, Japanese Patent Publication JP 2015/223995 A, Dec. 2015, Japanese Patent Office Publication (Year: 2015).*

(Continued)

Primary Examiner — Nadeem Odeh
(74) Attorney, Agent, or Firm — Fujitsu Patent Center

(57) ABSTRACT

A flying device configured to communicate with a controller device operated by a user, the flying device includes: a memory; and a processor coupled to the memory and configured to: determine whether the flying device is in contact with an object based on a signal from a contact detector; and move the flying device in a direction corresponding to an operation command transmitted from the controller device while causing a thrust force to be produced so that a contact between the object and the flying device is maintained when it is determined that the flying device is in contact with the object.

4 Claims, 20 Drawing Sheets

(51) Int. Cl.
    *B64C 39/02*     (2006.01)
    *G05D 1/00*     (2006.01)
    *B64C 27/08*     (2006.01)

(52) U.S. Cl.
    CPC ............ *G05D 1/0022* (2013.01); *B64C 27/08* (2013.01); *B64C 2201/027* (2013.01); *B64C 2201/141* (2013.01); *B64C 2201/146* (2013.01)

(58) Field of Classification Search
    CPC ............ B64C 2201/027; B64C 27/08; B64C 2201/141; B64C 2201/146
    USPC ............................................................ 701/2
    See application file for complete search history.

(56) References Cited

U.S. PATENT DOCUMENTS

2015/0286216 A1    10/2015   Miwa
2017/0123435 A1*   5/2017   Myeong ................. B25J 9/1676

FOREIGN PATENT DOCUMENTS

| JP | 2010-052713 | | 3/2010 | |
| JP | 2014-137694 | | 7/2014 | |
| JP | 2015-223995 | | 12/2015 | |
| JP | 2015223995 | A * | 12/2015 | |
| JP | 2016026946 | A * | 2/2016 | |
| JP | 2016043922 | A * | 4/2016 | |
| WO | 2014/068982 | | 5/2014 | |
| WO | WO-2015072548 | A1 * | 5/2015 | ........... B64C 39/024 |

OTHER PUBLICATIONS

Alexis et al., Hybrid Modeling and Control of a Coaxial Unmanned Rotorcraft Interacting with its Environment through Contact, May 2013, IEEE, 2013 IEEE International Conference on Robotics and Automation (ICRA) (Year: 2013).*
English Translation:Takahashi et al., WO 2015072548 A1, May 2015, WIPO Patent Publication (Year: 2015).*
English Translation: Yamada et al., JP 2016026946 A, Feb. 2016, Japanese Patent Office Publication (Year: 2016).*
English Translation: Yamada et al., JP 2016043922 A, Apr. 2016, Japanese Patent Office Publication (Year: 2016).*

* cited by examiner

UNMANNED AERIAL VEHICLE AND CONTROL METHOD OF UNMANNED AERIAL VEHICLE

CROSS-REFERENCE TO RELATED APPLICATION

This application is based upon and claims the benefit of priority of the prior Japanese Patent Application No. 2016-178977 filed on Sep. 13, 2016, the entire contents of which are incorporated herein by reference.

FIELD

A certain aspect of the embodiments is related to a flying device, a non-transitory computer-readable storage medium, and a control method of a flying device.

BACKGROUND

Local governments that administer constructions such as bridges constructed in the past often face a shortage of workers who check constructions. Thus, in recent years, use of flying devices that execute tasks such as taking photos or recording videos of constructions with a camera during unmanned flight has started as disclosed in, for example, International Publication No. 2014/068982 and Japanese Patent Application Publication Nos. 2014-137694, 2015-223995, 2008-290704, and 2007-331426.

SUMMARY

According to an aspect of the embodiments, there is provided a flying device configured to communicate with a controller device operated by a user, the flying device including: a memory; and a processor coupled to the memory and configured to: determine whether the flying device is in contact with an object based on a signal from a contact detector; and move the flying device in a direction corresponding to an operation command transmitted from the controller device while causing a thrust force to be produced so that a contact between the object and the flying device is maintained when it is determined that the flying device is in contact with the object.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

As described previously, in recent years, use of flying devices that execute tasks such as taking photos or recording videos of constructions with a camera during unmanned flight has started. However, when remotely operating a flying device with a controller device, getting a sense of the distance between the flying device and the construction is difficult. Thus, the flying device may crash as a result of an erroneous operation of the flying device.

First Embodiment

Figure 1:
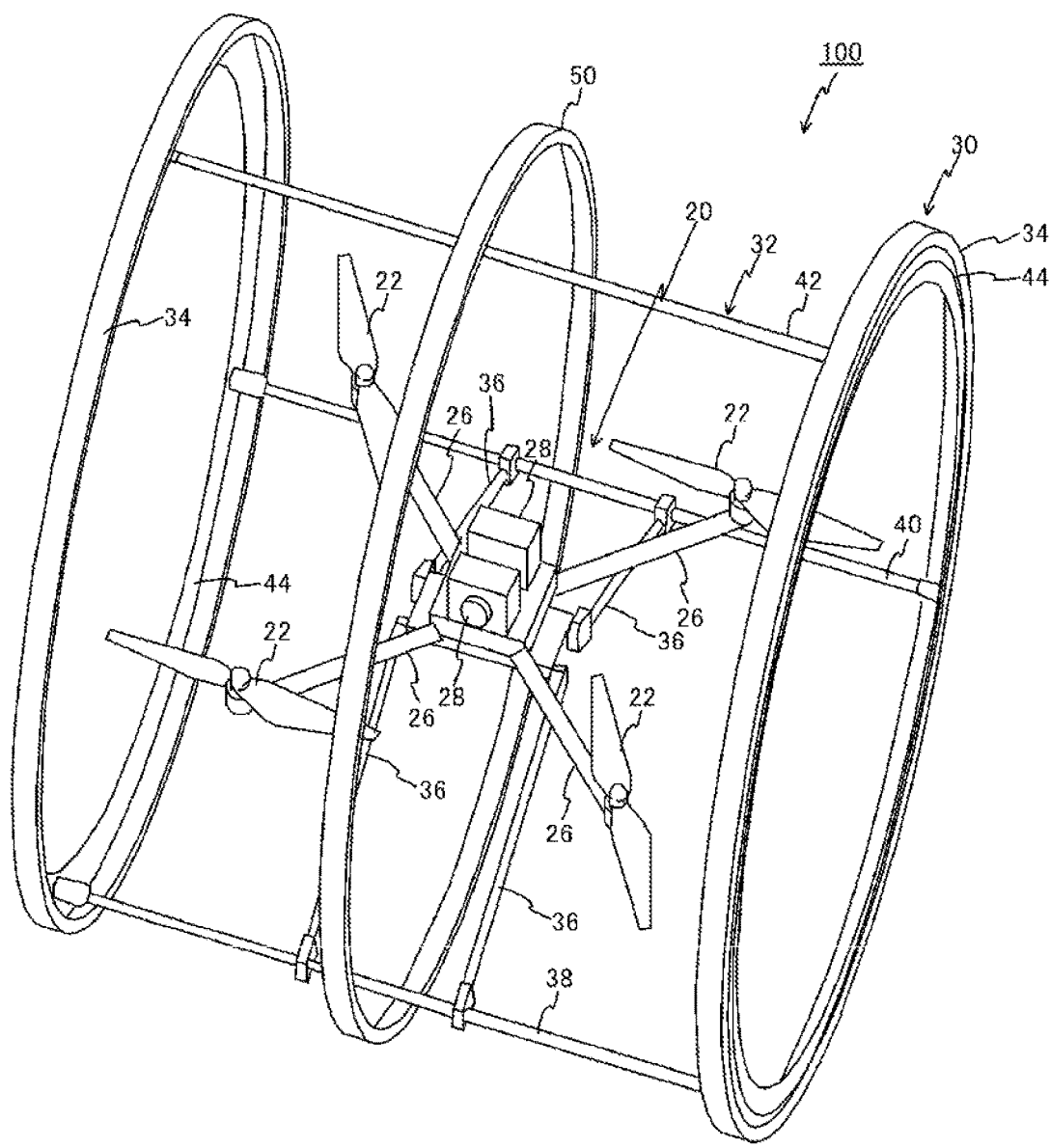
FIG. 1 is a perspective view illustrating a structure of a multicopter in accordance with a first embodiment.

Hereinafter, a detailed description will be given of a first embodiment of a flying device based on FIG. 1 through FIG. 6. FIG. 1 is a perspective view of a multicopter 100 that is the first embodiment of a flying device. In the first embodiment, the multicopter 100 is a device for checking a construction (a bridge or the like) as an object, and flies by the construction to capture images of the construction. The multicopter 100 includes a multicopter main body 20 as a flying device main body and a frame structure 30 as illustrated in FIG. 1.

The multicopter main body 20 includes a plurality of (four in FIG. 1) rotors 22. All the rotors 22 are horizontally disposed, and are rotated by torque of a motor or the like. A plurality of (four in FIG. 1) arms 26 extend from the center portion of the multicopter main body 20 in the horizontal direction in an X-shape, and the rotors 22 are located at the ends of the arms 26. In addition, the multicopter main body 20 includes a pair of cameras 28.

The frame structure 30 includes a frame 32, a pair of wheels 34, and four elastic supporting members 36. The frame 32 has a substantially cylindrical cage shape, and surrounds the entire of the multicopter main body 20. The frame 32 includes a pair of fixing rods 38 and 40, a protection rod 42, and a pair of annular connecting members 44. The fixing rods 38 and 40 are supported by the multicopter main body 20 through four elastic supporting members 36. The annular connecting members 44 are fixed to first and second ends of the fixing rods 38 and the protection rods 42. The pair of wheels 34 is located at both ends of the frame 32 in the axis direction. The pair of wheels 34 is rotatable relative to the connecting members 44 of the frame 32. For example, when the multicopter 100 approaches a wall or ceiling of the construction, and then moves while the wheels 34 are in contact with the wall or ceiling, the wheels 34 rotate and guide the multicopter 100 along the wall or ceiling.

Figure 2A:
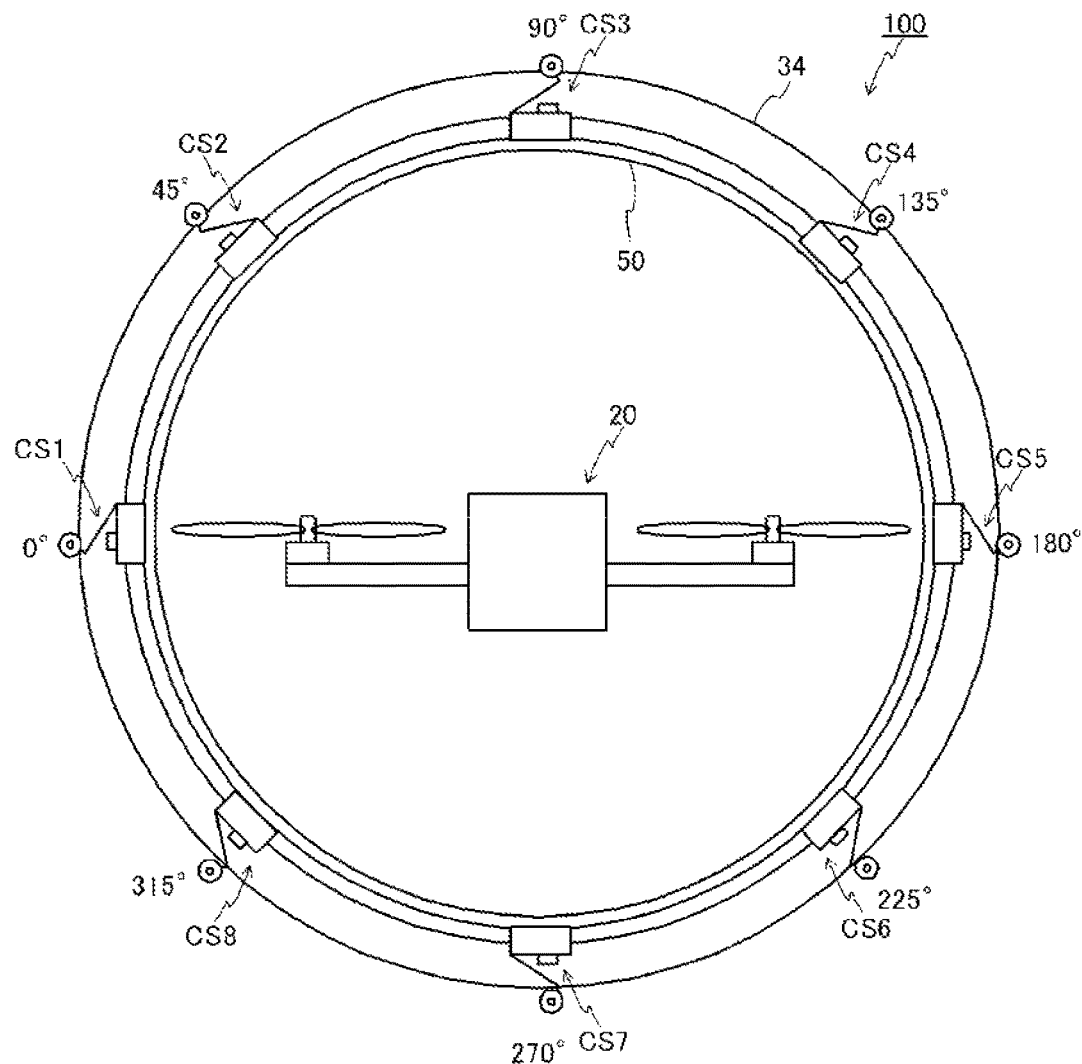
FIG. 2A schematically illustrates a positional relation among a contact sensor holding member, wheels, and a multicopter main body.

An annular contact sensor holding member 50 is located in substantially the middle of the frame 32 (the fixing rods 38 and 40 and the protection rod 42). The contact sensor holding member 50 is an example of a ring-shaped member. FIG. 2A schematically illustrates a positional relation among the contact sensor holding member 50, the wheels 34, and the multicopter main body 20. As illustrated in FIG. 2A, the contact sensor holding member 50 holds a plurality of (eight in FIG. 2A) contact sensors CS1 through CS8, which are not illustrated in FIG. 1. In the first embodiment, the contact sensors CS1 through CS8 are arranged at equal angular intervals. The position of the contact sensor CS1 is defined as a position of 0°, the position of the contact sensor CS2 is defined as a position of 45°, the position of the contact sensor CS3 is defined as a position of 90°, . . . , and the position of the contact sensor CS8 is defined as a position of 315°.

Figure 2B:
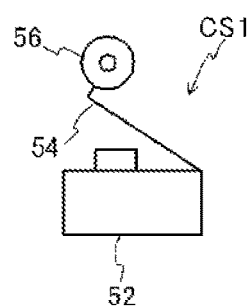
FIG. 2B and FIG. 2C are enlarged schematic views of a contact sensor.
Figure 2C:
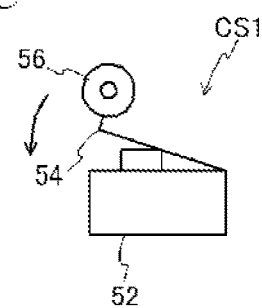

FIG. 2B is an enlarged schematic view of the contact sensor CS1. As illustrated in FIG. 2B, the contact sensor CS1 includes a contact switch 52, a pressing member 54, and a roller 56. When the roller 56 comes in contact with a wall or ceiling of the construction, the roller 56 and the pressing member 54 move as indicated by an arrow in FIG. 2C. Accordingly, the pressing member 54 presses the contact switch 52, and the contact sensor CS1 thereby detects application of external force to the roller 56, i.e., presence (ON) or absence (OFF) of contact, and outputs an ON/OFF signal. The contact sensors CS2 through CS8 have the same structure.

The contact sensor holding member 50 has a smaller diameter than the wheels 34 as illustrated in FIG. 2A, and the rollers 56 of the contact sensors CS1 through CS8 are located slightly further out than the wheels 34. Thus, when the pair of wheels 34 is in contact with a wall or ceiling, the roller 56 of one of the contact sensors CS1 through CS8 is pressed. Thereby the contact with the wall or ceiling is detected.

In addition, while the contact sensors CS1 through CS8 are detecting the contact with a wall or ceiling, the roller 56 is in contact with the wall or ceiling. Thus, even when the multicopter 100 moves along the wall or ceiling, the friction between the roller 56 and the wall or ceiling is reduced because the roller 56 rotates. Therefore, the multicopter 100 smoothly moves while maintaining the contact with the wall or ceiling.

Figure 3:
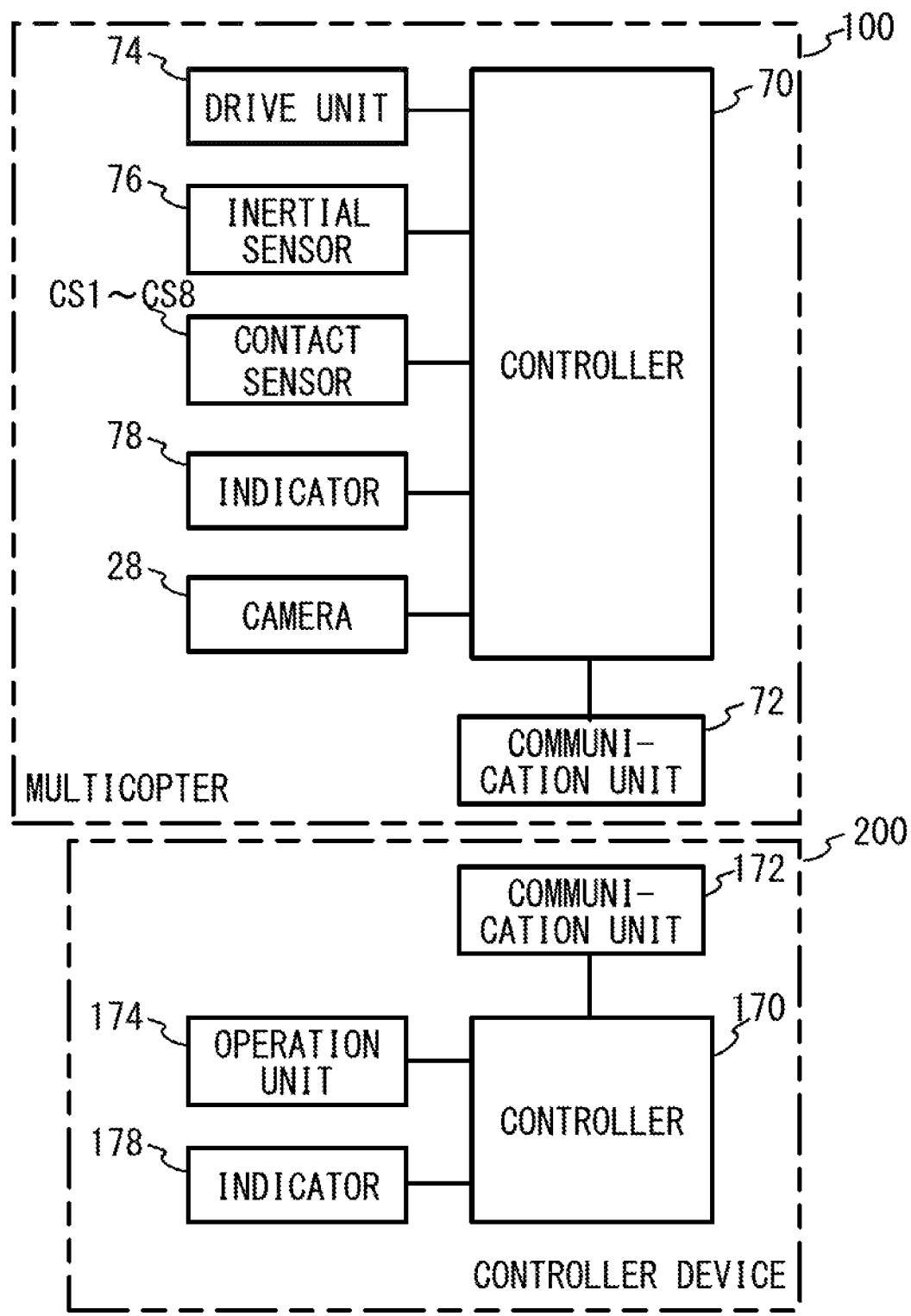
FIG. 3 is a block diagram of a control system of the multicopter in accordance with the first embodiment and a control system of a controller device.

FIG. 3 is a block diagram of a control system of the multicopter 100 in accordance with the first embodiment and a control system of a controller device 200 that communicates with the multicopter 100 and is used to remotely operate the multicopter 100. As illustrated in FIG. 3, the control system of the multicopter 100 includes a communication unit 72, a drive unit 74, an inertial sensor 76, the contact sensors CS1 through CS8, an indicator 78, the cameras 28, and a controller 70.

The communication unit 72 wirelessly communicates with the controller device 200. The communication unit 72 receives information about the operation made by a user in the controller device 200 (an operation command), and transmits the received information to the controller 70. The communication unit 72 also transmits an indication instruction to a controller 170 of the controller device 200 under the control of the controller 70.

The drive unit 74 includes a motor and the like for driving the rotors 22 described previously. The drive unit 74 is controlled by the controller 70 in response to the operation by the user in the controller device 200. The inertial sensor 76 detects acceleration and angular velocity, and outputs the detected acceleration and angular velocity to the controller 70. The indicator 78 includes an LED or the like, and changes the lighting color of the LED and the way of flashing of the LED under the control of the controller 70 to indicate which of states, an ON state or an OFF state, an automatic sticking control described later is in, whether or not contact with a wall is maintained, or whether or not contact with a ceiling is maintained. The camera 28 captures images of the construction in response to the operation by the user in the controller device 200 or under the control of the controller 70. Images captured by the camera 28 are stored in a storage unit, which is not illustrated.

Figure 4:
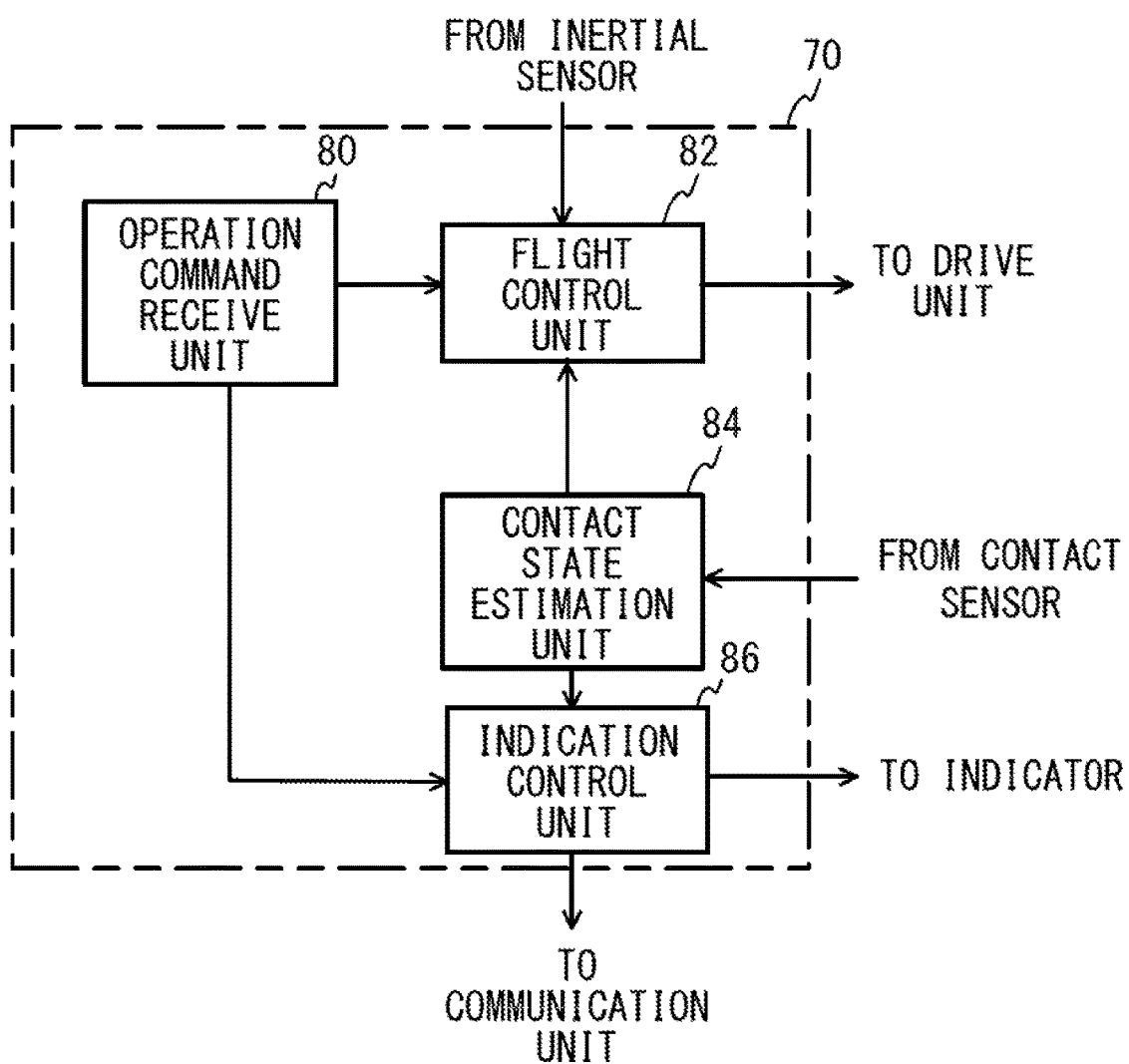
FIG. 4 is a functional block diagram of a controller of the multicopter illustrated in FIG. 3.

The controller 70 controls each unit according to the operation by the user in the controller device 200. The controller 70 includes a central processing unit (CPU), a random access memory (RAM), a read only memory (ROM) and the like. Execution of programs by the CPU causes the controller 70 to function as an operation command receive unit 80, a flight control unit 82 as a thrust control unit, a contact state estimation unit 84 as a determination unit, and an indication control unit 86, which are illustrated in FIG. 4.

The operation command receive unit 80 receives information about the operation made by the user in the controller device 200 (an operation command), and transmits the received information to the flight control unit 82. The contact state estimation unit 84 estimates the contact state of the multicopter 100 with a wall or ceiling based on detection results (signals indicating presence or absence of contact) of the contact sensors CS1 through CS8.

The flight control unit 82 controls the drive unit 74 based on the operation command received from the operation command receive unit 80, detection values of the inertial sensor 76, and the estimation result by the contact state estimation unit 84. Here, the user can switch the ON/OFF state of the "automatic sticking control" that moves the multicopter 100 along a wall or ceiling by using the controller device 200. When receiving information indicating that the automatic sticking control is in an ON state through the operation command receive unit 80, the flight control unit 82 controls the drive unit 74 so that the multicopter 100 moves as operated by the user in the controller device 200 while controlling the drive unit 74 so that the contact state of the multicopter 100 with a wall or ceiling of the construction is maintained. That is, for example, when the user moves the multicopter 100 upward along a wall, the user can easily move the multicopter 100 along the wall by inputting an operation command for moving the multicopter 100 upward without inputting an operation command for diagonally moving the multicopter 100 that includes a component in a direction toward the wall and a component in an upward direction.

The indication control unit 86 causes the indicator 78 to indicate which of states, an ON state or an OFF state, the automatic sticking control is in, or which of a wall or a ceiling the multicopter 100 is moving along. The user can understand the current state of the automatic sticking control by checking the multicopter 100. In addition, the indication control unit 86 transmits an indication instruction, which causes an indicator 178 of the controller device 200 to give the same indication, to the controller 170 of the controller device 200 through the communication unit 72.

Returning back to FIG. 3, the controller device 200 is a device that allows a user to remotely operate the multicopter 100. The control system of the controller device 200 includes a communication unit 172, an operation unit 174, the indicator 178, and the controller 170.

The communication unit 172 transmits and receives information to and from the communication unit 72 of the multicopter 100. The operation unit 174 receives input of an operation command by the user, and transmits the received operation command to the controller 170. The operation command includes a yaw angular velocity, a roll angle, a pitch angle, and an amount of throttle. The controller 170 transmits the received operation command to the multicopter 100 through the communication unit 172.

The indicator 178 includes an LED or the like, and gives an indication under the instruction of the controller 170 when the controller 170 receives the indication instruction from the multicopter 100 through the communication unit 172. Examples of the indication instruction includes an instruction for indicating which of states, an ON state or an OFF state, the automatic sticking control is in, and an instruction for indicating which of a wall or a ceiling the multicopter 100 is moving along. The user can understand the current state of the automatic sticking control by checking the controller device 200. The controller 170 overall controls each unit of the controller device 200.

Operations of Multicopter 100

Figure 5:
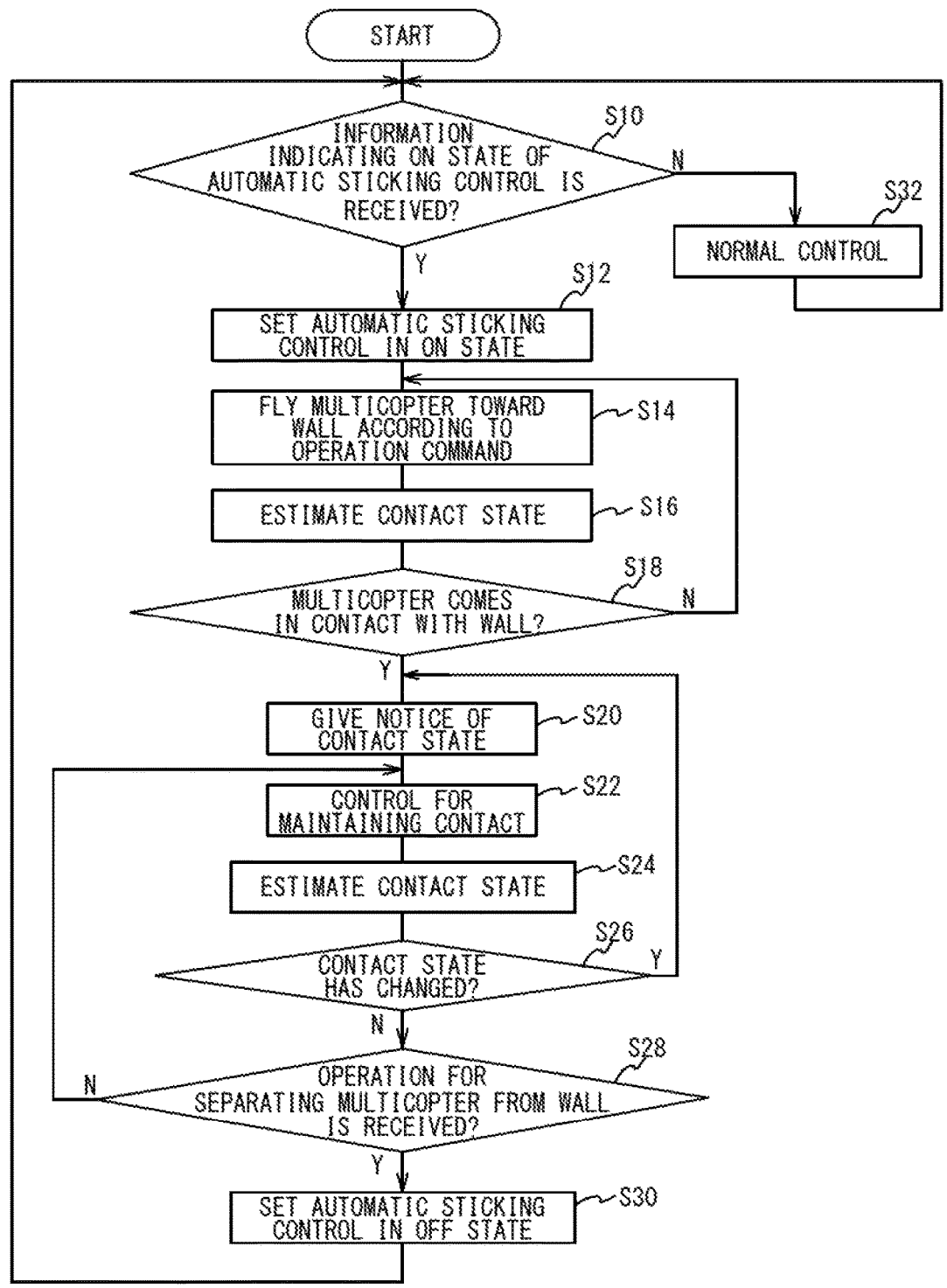
FIG. 5 is a flowchart illustrating operations of the multicopter in accordance with the first embodiment.

Next, a description will be given of operations of the multicopter 100 along the flowchart of FIG. 5 while appropriately referring to other drawings. In this process, a description will be given of a case where a wall or ceiling of a bridge is checked by using the multicopter 100.

At step S10, the flight control unit 82 determines whether the flight control unit 82 receives from the controller device 200 information indicating that the automatic sticking control is in an ON state. The automatic sticking control is a control for moving the multicopter 100 along a wall or ceiling of the bridge through a simple operation. When the user sets the automatic sticking control in an ON state in the controller device 200, the determination at step S10 becomes Yes. When the automatic sticking control is not set in an ON state, the determination at step S10 is No.

When the determination at step S10 is No, the process moves to step S32, and the flight control unit 82 executes a normal control. In this case, the flight control unit 82 controls the operation of the drive unit 74 based on the operation command input by the user and the detection values of the inertial sensor 76, flying the multicopter 100. During the normal control, the cameras 28 may capture images in response to the input by the user or at specified time intervals. This configuration allows images for checking a wall or ceiling of the bridge to be captured. After step S32, the process returns to step S10.

On the other hand, when the determination at step S10 is Yes, and the process moves to step S12, the flight control unit 82 sets the automatic sticking control in an ON state. The indication control unit 86 causes the indicator 78 to indicate that the automatic sticking control is in an ON state when receiving from the operation command receive unit 80 information indicating that the automatic sticking control has been set in an ON state. Additionally, the indication control unit 86 transmits the indication instruction for causing the indicator 178 of the controller device 200 to give the same indication to the controller 170 through the communication unit 72.

Then at step S14, the flight control unit 82 controls the drive unit 74 according to the operation command input by the user, flying the multicopter 100 toward a wall.

Then at step S16, the contact state estimation unit 84 estimates a contact state. In this step, the contact state is estimated by determining whether any one of the contact sensors CS1 through CS8 is detecting the presence (ON) of contact.

Then at step S18, the contact state estimation unit 84 determines whether the multicopter 100 comes in contact with a wall. For example, when the contact sensor CS1 illustrated in FIG. 2A is detecting the presence (ON) of contact, the contact state estimation unit 84 determines that the multicopter 100 is in contact with a wall on the left side (a left wall). Alternatively, when the contact sensor CS3 illustrated in FIG. 2A is detecting the presence (ON) of contact, the contact state estimation unit 84 determines that the multicopter 100 is in contact with a wall on the upper side (i.e., a ceiling). When the determination at step S18 is No, the process returns to step S14, while the process moves to step S20 when the determination at step S18 is Yes.

At step S20, the indication control unit 86 gives notice of the contact state. More specifically, the indication control unit 86 indicates by the indicator 78 which of a wall or a ceiling the multicopter 100 is being in contact with. In addition, the indication control unit 86 transmits an instruction for indicating which of a wall or a ceiling the multicopter 100 is being in contact with (the indication instruction) to the controller 170 of the controller device 200. The controller 170 gives an indication using the indicator 178 based on the indication instruction.

Figure 6:
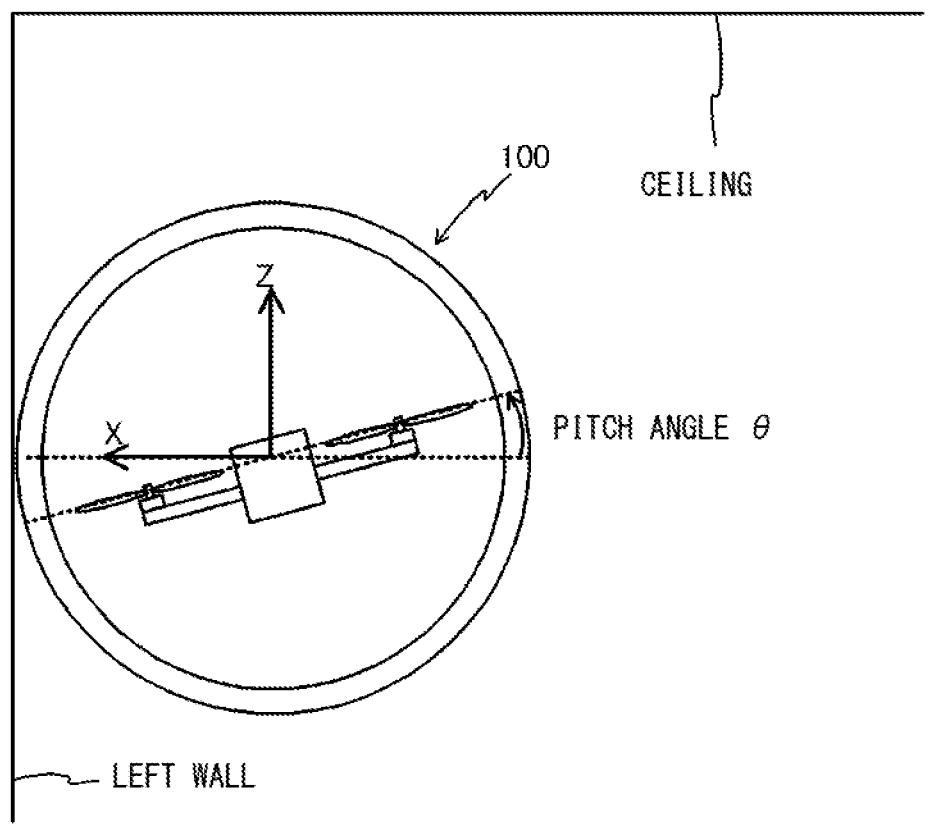
FIG. 6 is a diagram for describing step S22 in FIG. 5.

Then at step S22, the flight control unit 82 executes a control for maintaining the contact through the drive unit 74. In this step, when the multicopter 100 is in contact with a left wall as illustrated in FIG. 6, the flight control unit 82 drives the drive unit 74 according to an operation command while maintaining the pitch angle θ (i.e., while causing the thrust force in the X-axis direction in FIG. 6 to be produced) to maintain the contact with the left wall. For example, when the user inputs an operation command for moving the multicopter 100 in the positive direction of the Z-axis direction (upward) in FIG. 6, the flight control unit 82 controls the drive unit 74 (the rotors 22) so that the multicopter 100 moves in the positive direction of the Z-axis direction while maintaining the pitch angle θ. When the multicopter 100 is being in contact with a ceiling and the user inputs an operation command for moving the multicopter 100 in the X-axis direction (for example, rightward), the flight control unit 82 controls the drive unit 74 to produce an upward thrust force for maintaining the contact state of the multicopter 100 with the ceiling and adjust the pitch angle to move the multicopter 100 rightward.

At step S22, the cameras 28 may capture images in response to the input by the user or at specified time intervals during the control for maintaining the contact. This allows images for checking a wall or ceiling of the bridge to be captured.

Then at step S24, the contact state estimation unit 84 estimates the contact state in the same manner as step S16 described previously.

Then at step S26, the contact state estimation unit 84 determines whether the contact state has changed. For example, the contact state estimation unit 84 determines whether the state of the multicopter 100 has changed from the state where the multicopter 100 is in contact with the left wall to the state where the multicopter 100 is in contact with the left wall and a ceiling. When the determination at step S26 is Yes, the process returns to step S20. When the process returns to step S20, the processes of steps S20 through S26 are executed according to the contact state that has changed. For example, when the state of the multicopter 100 has changed from the state where the multicopter 100 is in contact with the left wall to the state where the multicopter 100 is in contact with the left wall and a ceiling, it is reported that the multicopter 100 has come in contact with the ceiling at step S20, and a control for maintaining the contact state with the ceiling is executed at step S22.

On the other hand, when the determination at step S26 is No, that is, when the contact state remains unchanged, the process moves to step S28. At step S28, the flight control unit 82 determines whether the operation command receive unit 80 has received an operation command for separating the multicopter 100 from the wall with which the multicopter 100 is being in contact. When the determination at step S28 is No, the process returns to step S22, while the process moves to step S30 when the determination at step S28 is Yes. The operation command for separating the multicopter 100 from the wall with which the multicopter 100 is being in contact is, for example, an operation command for moving rightward the multicopter 100 that is being in contact with a left wall.

At step S30, the flight control unit 82 sets the automatic sticking control in an OFF state, and returns to step S10. When the automatic sticking control is set in an OFF state, the indication control unit 86 causes the indicator 78 to indicate that the automatic sticking control is set in an OFF state. In addition, the indication control unit 86 transmits an indication instruction for causing the indicator 178 of the controller device 200 to give the same indication to the controller 170 through the communication unit 72.

As described in detail above, in the first embodiment, the contact state estimation unit 84 determines whether the multicopter 100 is in contact with a wall or ceiling based on signals (ON/OFF signals indicating presence of contact) from the contact sensors CS1 through CS8 (S18). When the contact state estimation unit 84 determines that the multicopter 100 is in contact with a wall or ceiling (S18: Yes), the flight control unit 82 moves the multicopter 100 in the direction corresponding to the operation command transmitted from the controller device 200 while causing a thrust force to be produced so that the contact between the wall or ceiling and the multicopter 100 is maintained. This operation enables the user to easily move the multicopter 100 along a wall or ceiling without performing an operation for maintaining the contact with the wall or ceiling. Therefore, the unstable flight of the multicopter 100 near a wall or ceiling is reduced, and the occurrence of crash of the multicopter 100 is thereby reduced.

In addition, in the first embodiment, even when the angle of a wall varies (for example, when the lower half of the wall is parallel to the vertical direction and the upper half of the wall expands in the direction intersecting with the vertical direction and the horizontal direction like a bridge pier), the user can move the multicopter 100 along the wall by simple operations.

In addition, in the first embodiment, since the contact sensors CS1 through CS8 are sensors that detect an external force due to contact with a wall or ceiling, the contact with a wall or ceiling can be detected with a simple structure.

In addition, in the first embodiment, the multicopter main body 20 includes the rotors 22, the wheels 34 are rotatably supported by the frame 32 fixed to the multicopter main body 20, and the contact sensors CS1 through CS8 are attached to the contact sensor holding member 50 located between the two wheels 34 of the frame 32. At least one of the contact sensors CS1 through CS8 detects contact when the two wheels 34 come in contact with a wall or ceiling. Thus, a state where the wheels 34 are in contact with a wall or ceiling can be detected by at least one of the contact sensors CS1 through CS8.

The above first embodiment describes an exemplary case where eight contact sensors are provided, but does not intend to suggest any limitation. For example, the number of contact sensors may be greater than eight, or less than eight.

Figure 7A:
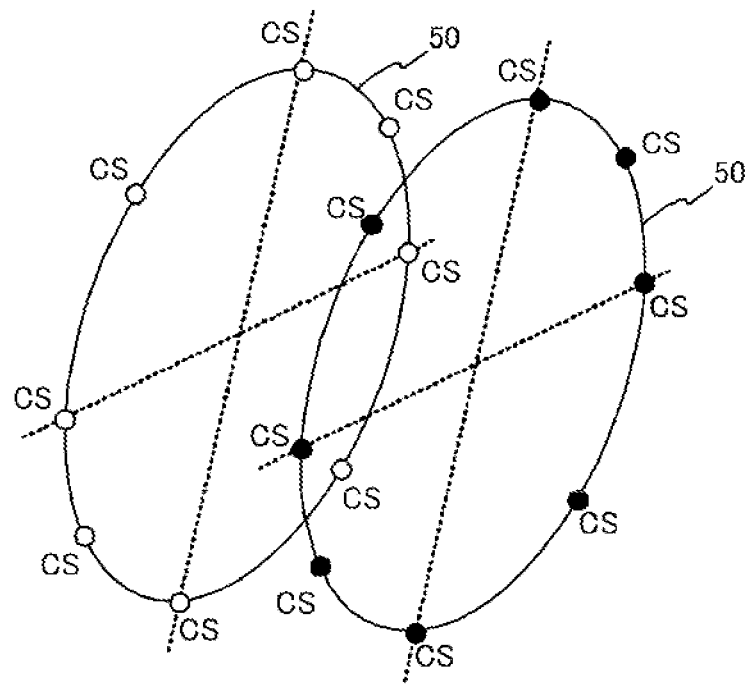
FIG. 7A and FIG. 7B illustrate variations of the arrangement of contact sensors.
Figure 7B:
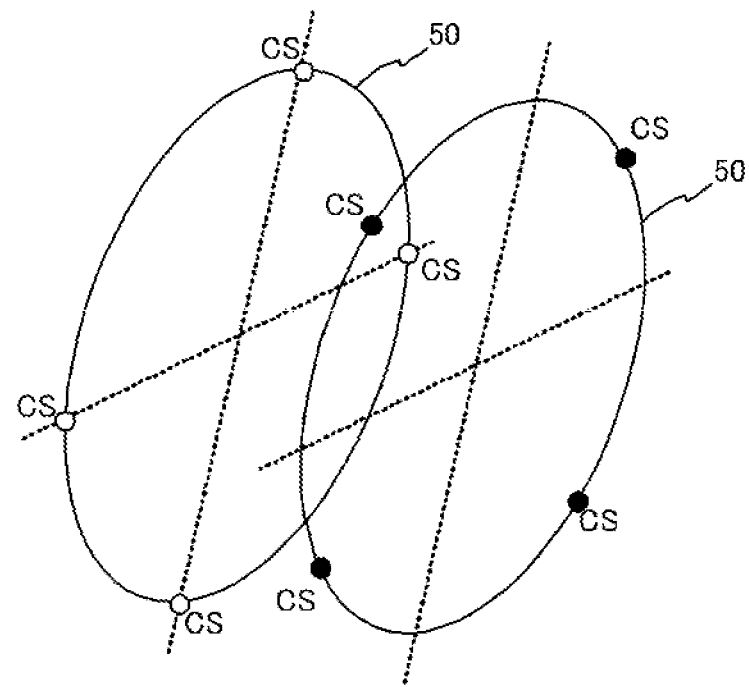

The above first embodiment describes an exemplary case where one contact sensor holding member 50 is provided, and the contact sensors CS1 through CS8 are attached to the contact sensor holding member 50, but does not intend to suggest any limitation. For example, as schematically illustrated in FIG. 7A, two contact sensor holding members 50 may be provided, and a plurality of contact sensors CS may be attached to each of the contact sensor holding members 50. The number of contact sensors CS may be other than eight. In this case, the locations (angular phases) of the contact sensors CS attached to one of two contact sensor holding members 50 may be shifted from the locations of the contact sensors CS attached to the other as illustrated in FIG. 7B.

Figure 8:
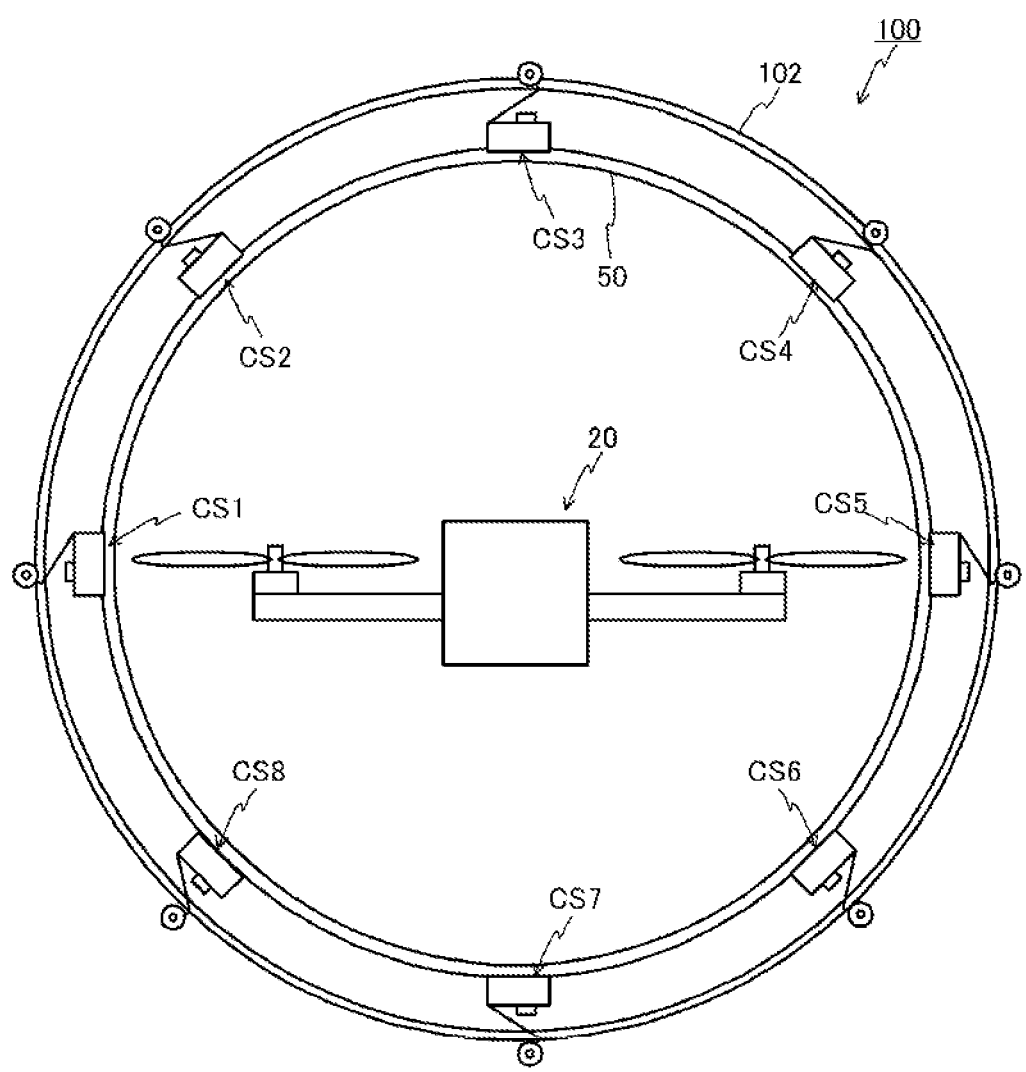
FIG. 8 illustrates a multicopter including a connecting member that connects a plurality of contact sensors.
Figure 9A:
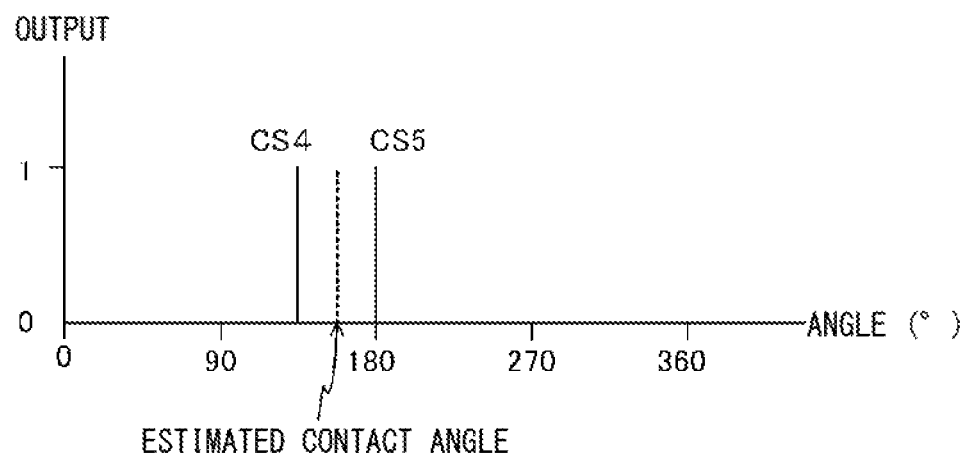
FIG. 9A and FIG. 9B are diagrams for describing a method of calculating an estimated contact angle in the example of FIG. 8.
Figure 9B:
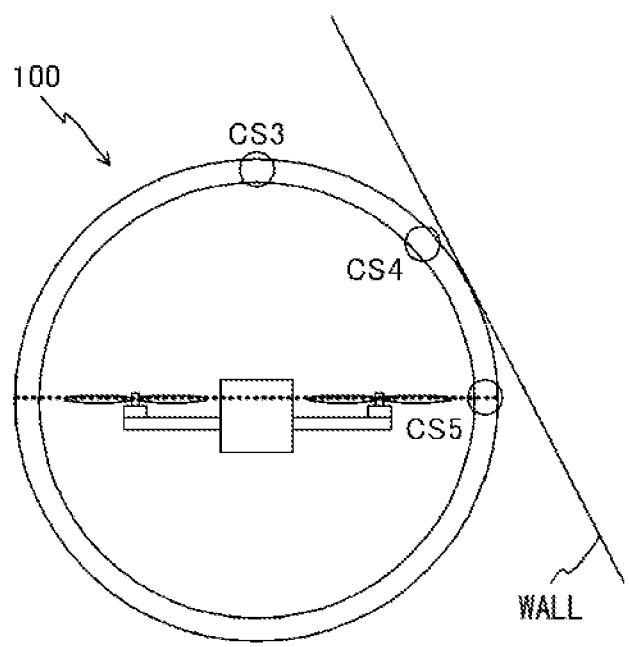

In the above first embodiment, as illustrated in FIG. 8, the vicinities of the rollers 56 of the contact sensors CS1 through CS8 may be connected by a ring-shaped connecting member 102. In FIG. 8, for convenience sake, the illustration of the wheels 34 is omitted. As illustrated in FIG. 8, by connecting the contact sensors CS1 through CS8 with the connecting member 102, the contact can be detected all around the multicopter 100 even when the contact sensors CS1 through CS8 are arranged at large intervals. For example, as illustrated in FIG. 9A, assume that the contact sensors CS4 and CS5 output signals indicating the presence (ON) of contact. In this case, as indicated by the dashed line in FIG. 9A, it can be estimated that a part between the contact sensors CS4 and CS5 is in contact with a wall (the multicopter 100 is in the state illustrated in FIG. 9B). In this case, the estimated contact angle can be calculated by the following equation (1). In the equation (1), a larger angle of angles of positions of contact sensors that detect contact is defined as $\varphi 1$, and a smaller angle is defined as $\varphi 2$.

$$\text{Estimated contact angle} = (\varphi 1 - \varphi 2)/2 + \varphi 2 \qquad (1)$$

Figure 10:
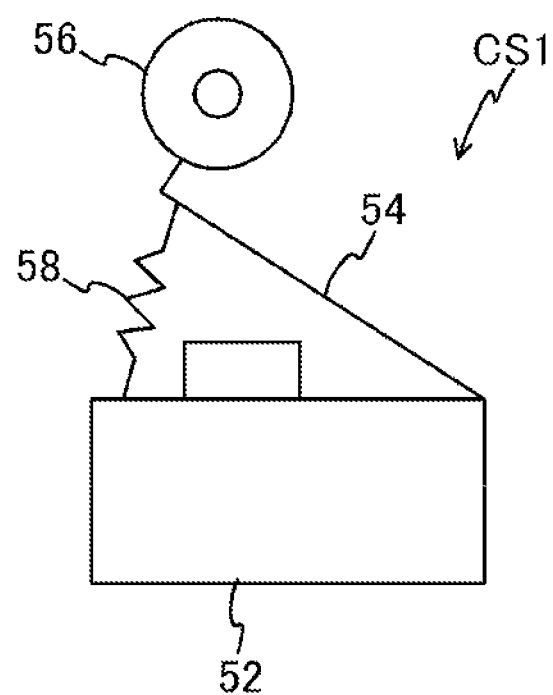
FIG. 10 illustrates an example that provides an elastic member to the contact sensor.

To prevent erroneous detection of the contact sensors CS1 through CS8 due to the effect of the weight of the connecting member 102 caused by provision of the connecting member 102 and the effect of disturbance such as wind, elastic members (springs or the like) 58 may be located between the contact switches 52 and the pressing members 54 of the contact sensors CS1 through CS8 as illustrated in FIG. 10. In this case, the sensitivity of the contact sensors CS1 through CS8 can be adjusted by making the elastic modulus of the elastic members 58 provided to the contact sensors CS1 through CS8 different. Accordingly, the erroneous detection caused by the weight of the connecting member 102 or disturbance such as wind can be reduced.

Figure 11:
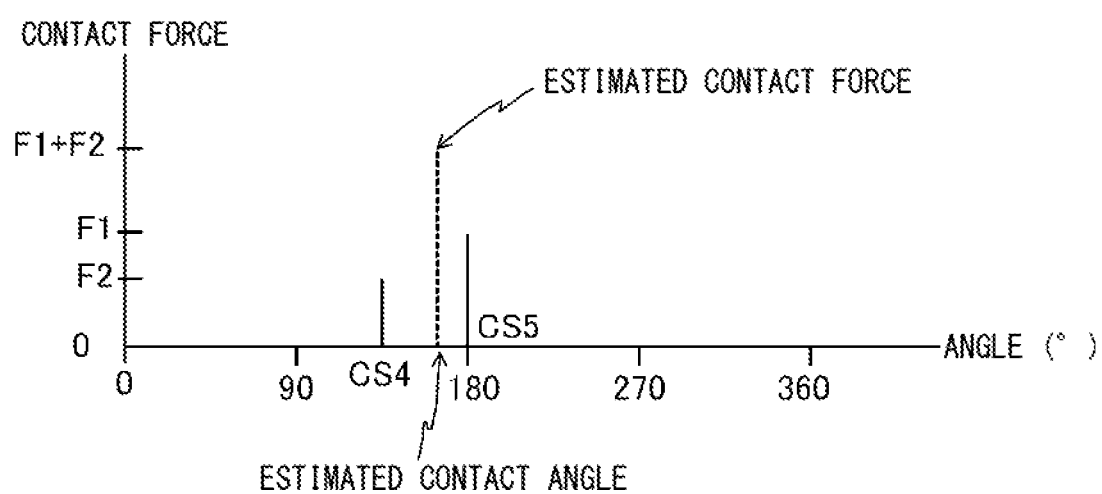
FIG. 11 is a diagram for describing a method of calculating an estimated contact force and an estimated contact angle when the contact sensor can detect a contact force.

The above first embodiment describes an exemplary case where the contact sensors CS1 through CS8 are sensors (switches) that detect presence (ON) or absence (OFF) of contact, but does not intend to suggest any limitation. For example, a force sensor may be used instead of the contact switch 52. The use of a force sensor enables to detect a contact direction in which the multicopter 100 is in contact with a wall or ceiling and a contact force between the multicopter 100 and the wall or ceiling. For example, when a force sensor is used in the example of FIG. 8, not only a contact angle but also a contact force can be detected as illustrated in FIG. 11. In this case, a contact force applied to the multicopter 100 (an estimated contact force) and an angle at which the estimated contact force acts on the multicopter 100 (an estimated contact angle) can be calculated by the following equations (2) and (3). In the following equations (2) and (3), the larger angle of angles of positions of contact sensors that detect contact is defined as φ1, and the contact force at the angle φ1 is defined as F1, while the smaller angle is defined as φ2, and the contact force at the angle φ2 is defined as F2.

$$\text{Estimated contact force} = F1 + F2 \quad (2)$$

$$\text{Estimated contact angle} = (F1/\text{estimated contact force}) \times (\varphi 1 - \varphi 2) + \varphi 2 \quad (3)$$

Second Embodiment

Figure 12:
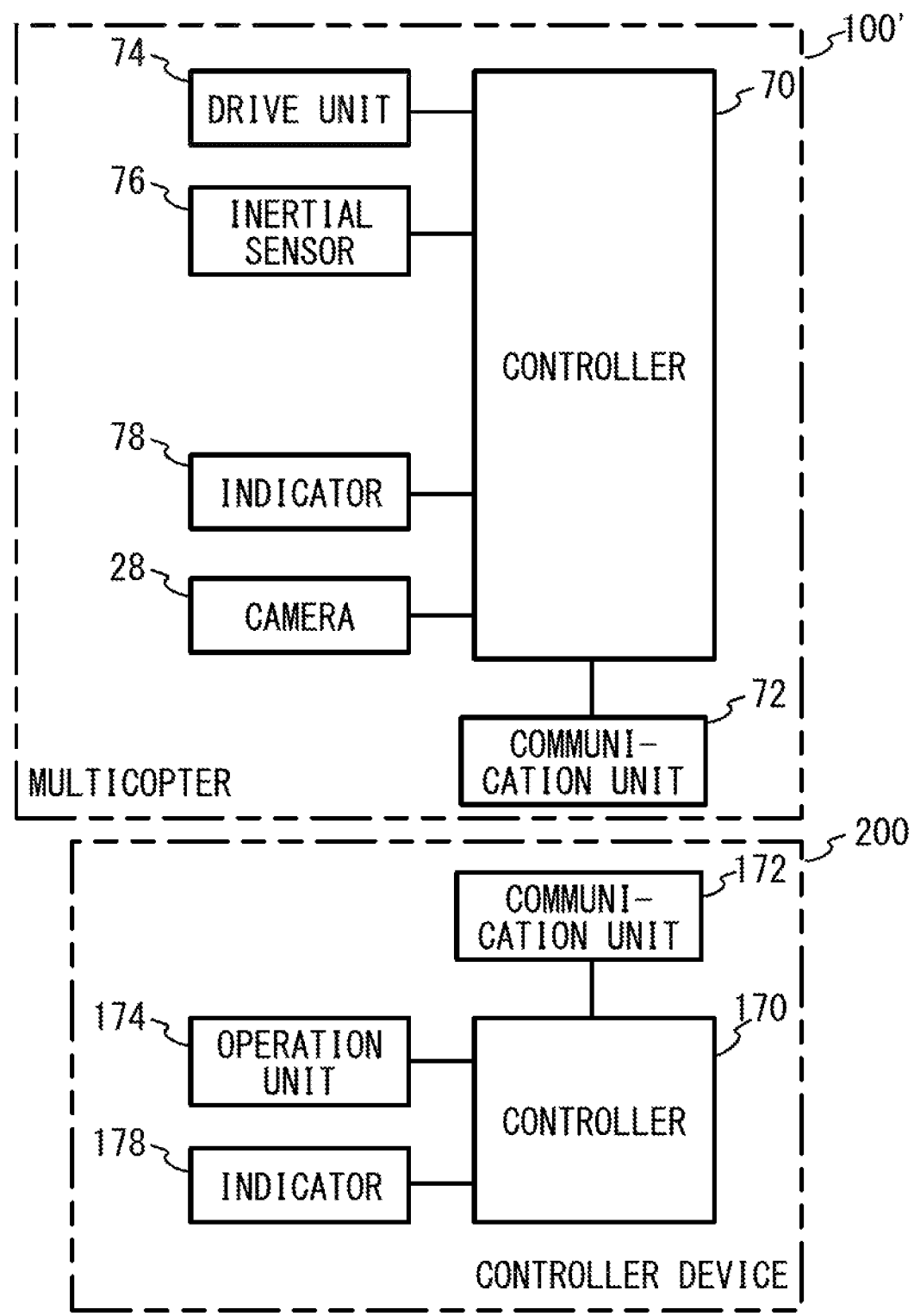
FIG. 12 is a block diagram of a control system of a multicopter and a control system of a controller device in accordance with a second embodiment.
Figure 13:
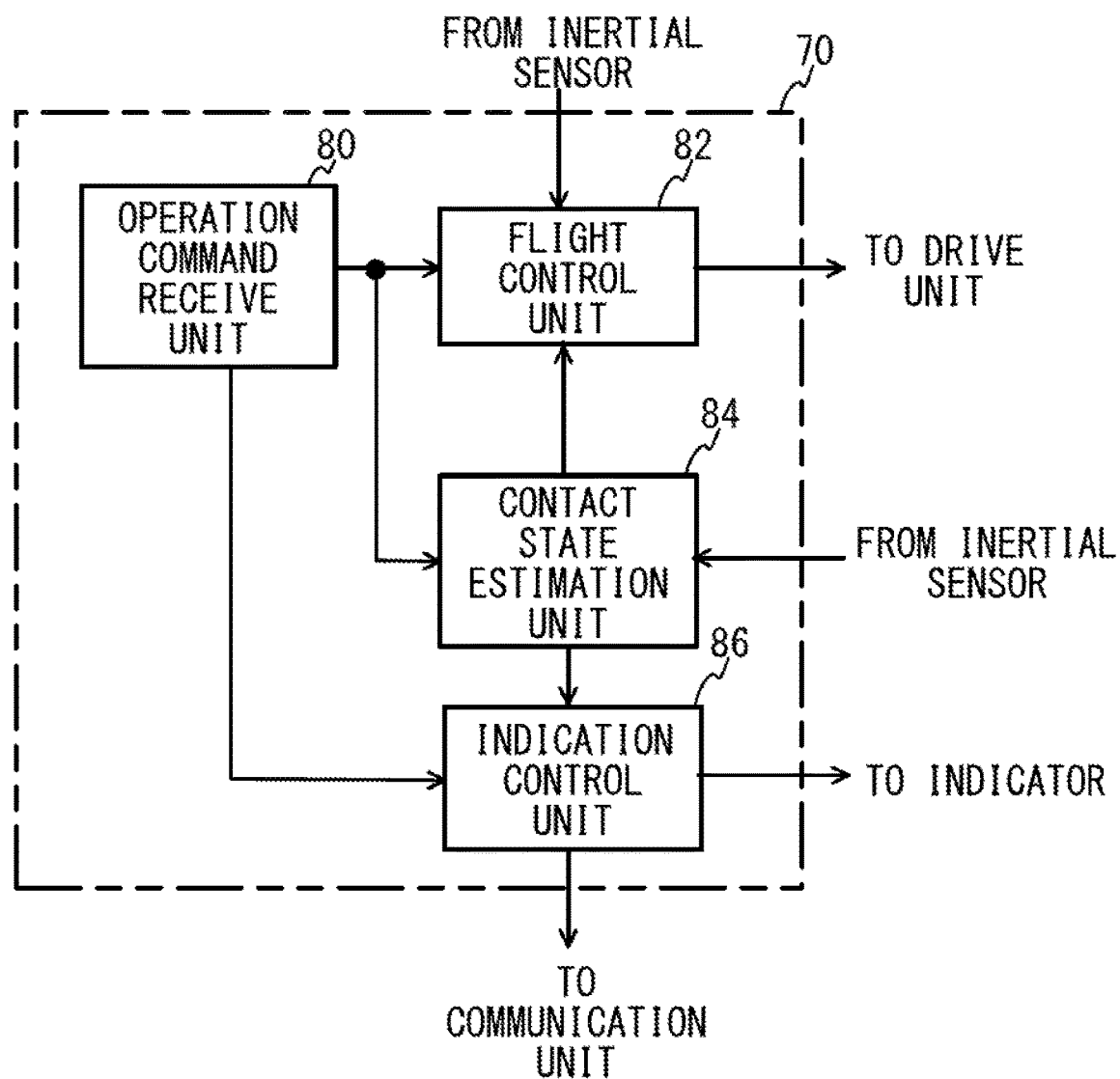
FIG. 13 is a functional block diagram of a controller of the multicopter illustrated in FIG. 12.

A description will next be given of a second embodiment based on FIG. 12 through FIG. 16B. FIG. 12 is a block diagram of control systems of a multicopter 100' in accordance with the second embodiment and the controller device 200, and FIG. 13 is a functional block diagram of a controller of FIG. 12. As clear from the comparison between FIG. 12 and FIG. 3, the multicopter 100' of the second embodiment differs from that of the first embodiment in that the multicopter 100' does not include the contact sensors CS1 through CS8. As clear from the comparison between FIG. 13 and FIG. 4, the controller 70 of the multicopter 100' of the second embodiment differs from that of the first embodiment in that the contact state estimation unit 84 estimates the contact state based on the operation command received by the operation command receive unit 80 and the output from the inertial sensor.

More specifically, the contact state estimation unit 84 of the second embodiment estimates the contact state with a wall or ceiling based on a correspondence relationship between the target value input by the user (an operation command) and the move of the multicopter caused by the operation (the output of the inertial sensor 76 mounted on the multicopter). The operation command includes a yaw angular velocity, a roll angle, a pitch angle, and an amount of throttle. The output of the inertial sensor includes an acceleration and an angular velocity. Hereinafter, an estimation method by the contact state estimation unit 84 will be described in detail by using three examples.

First Estimation Method (Rule Base)

Figure 14A:
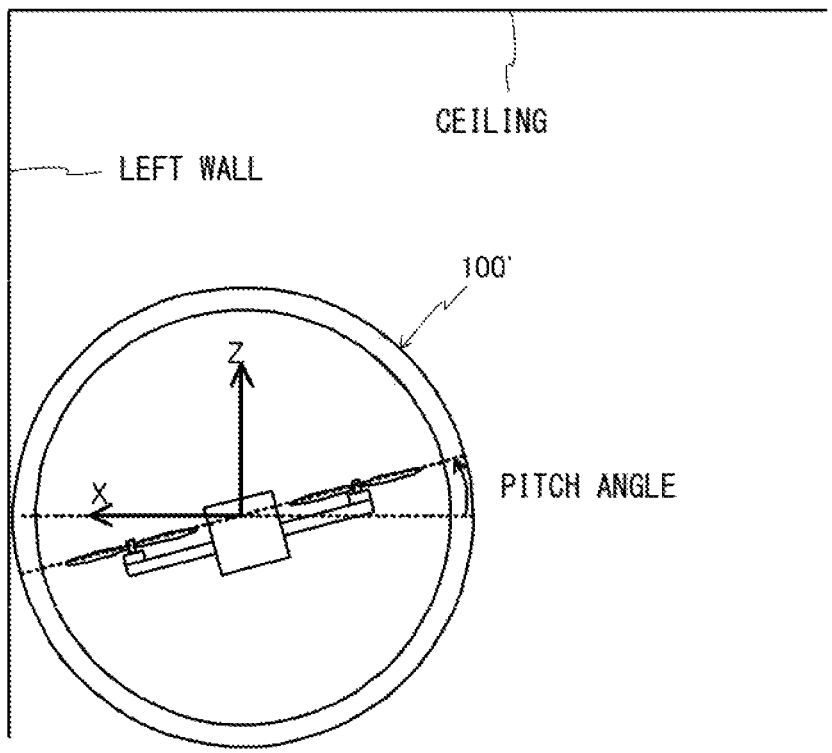
FIG. 14A and FIG. 14B are diagrams for describing a first estimation method (rule base) in accordance with the second embodiment.

A first estimation method estimates the contact state based on an operation command (a pitch angle) and the output of the inertial sensor 76 (an angular velocity) according to a predetermined rule. For simplicity's sake, a description will be given of a rule for determining which of states the multicopter 100' is in, a state where the multicopter 100' is in contact with a left wall (a left contact state) as illustrated in FIG. 14A or a state where the multicopter 100' is in contact with a ceiling (an upper contact state).

Figure 14B:
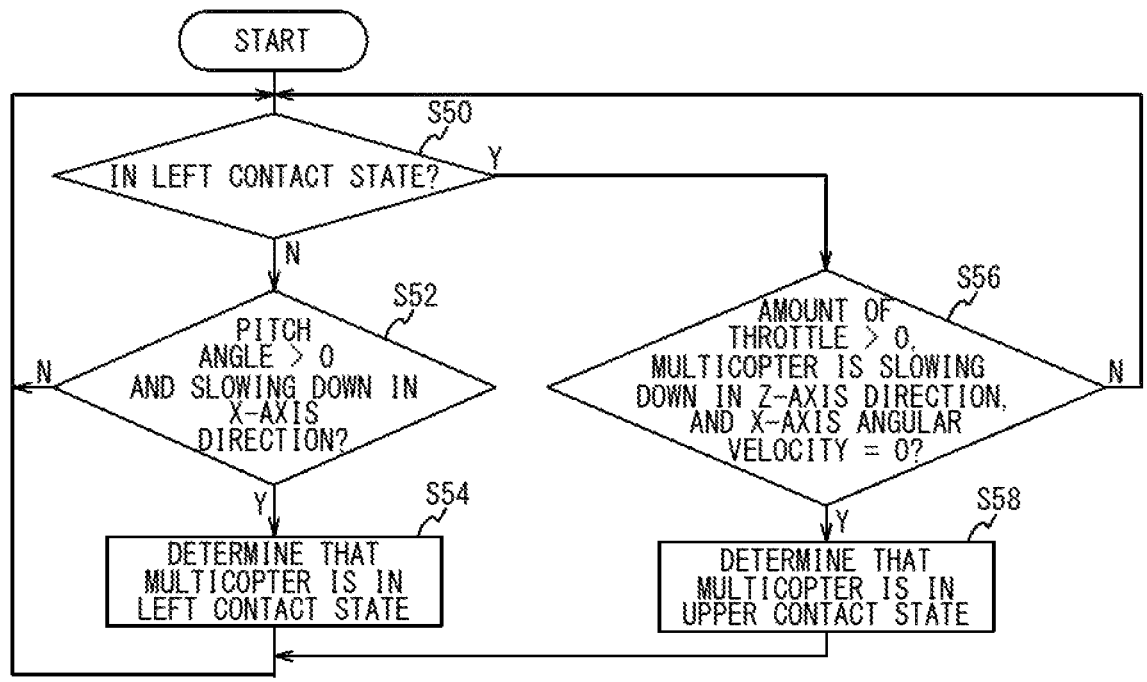

FIG. 14B is a flowchart illustrating processes executed by the contact state estimation unit 84 when a predetermined rule is applied. As illustrated in FIG. 14B, the contact state estimation unit 84 determines whether the state is the left contact state at step S50. At the initial state, since the multicopter 100' is on the ground and therefore is not in the left contact state, the determination at step S50 is No, and the process moves to step S52.

At step S52, the contact state estimation unit 84 determines whether the pitch angle (see FIG. 14A) of the operation command is greater than 0 and whether the output of the inertial sensor 76 is indicating that the multicopter 100 is slowing down in the X-axis direction. When the determination at step S52 is Yes, that is, when the thrust force according to the operation command is not being produced although the user is operating the multicopter 100' so that the multicopter 100' moves in the positive direction of the X-axis direction (leftward in FIG. 14A), the process moves to step S54, and it is determined that the multicopter 100 is in contact with the left wall (the left contact state). Thereafter, the process returns to step S50.

On the other hand, when the determination at step S52 is No, that is, when the user is operating the multicopter 100' so that the multicopter 100' moves in the X-axis direction and the thrust force according to the operation command is being produced, the multicopter 100' is not in contact with anywhere. In this case, the contact determination is not executed and the process returns to step S50.

When the process returns to step S50 after step S54, the determination at step S50 becomes Yes. In this case, the process moves to step S56, and the contact state estimation unit 84 determines whether the amount of throttle is greater than 0, whether the multicopter 100' is slowing down in the Z-axis direction, and whether the X-axis angular velocity is 0. That is, when the thrust force according to the operation command is not being produced and the multicopter 100' does not move even around the X-axis although the user is operating the multicopter 100' so that the multicopter 100' moves in the positive direction of the Z-axis direction (upward in FIG. 14A), the determination at step S56 becomes Yes, and the process moves to step S58.

At step S58, the contact state estimation unit 84 determines that the multicopter 100' is in contact with a ceiling (the upper contact state). Thereafter, the process returns to step S50. On the other hand, when the determination at step S56 is No, it can be determined that the left contact state is maintained, and the process returns to step S50.

The repetition of the above processes enables to estimate which of the left contact state or the upper contact state the multicopter 100' is in.

Second Estimation Method (Model Base)

Figure 15:
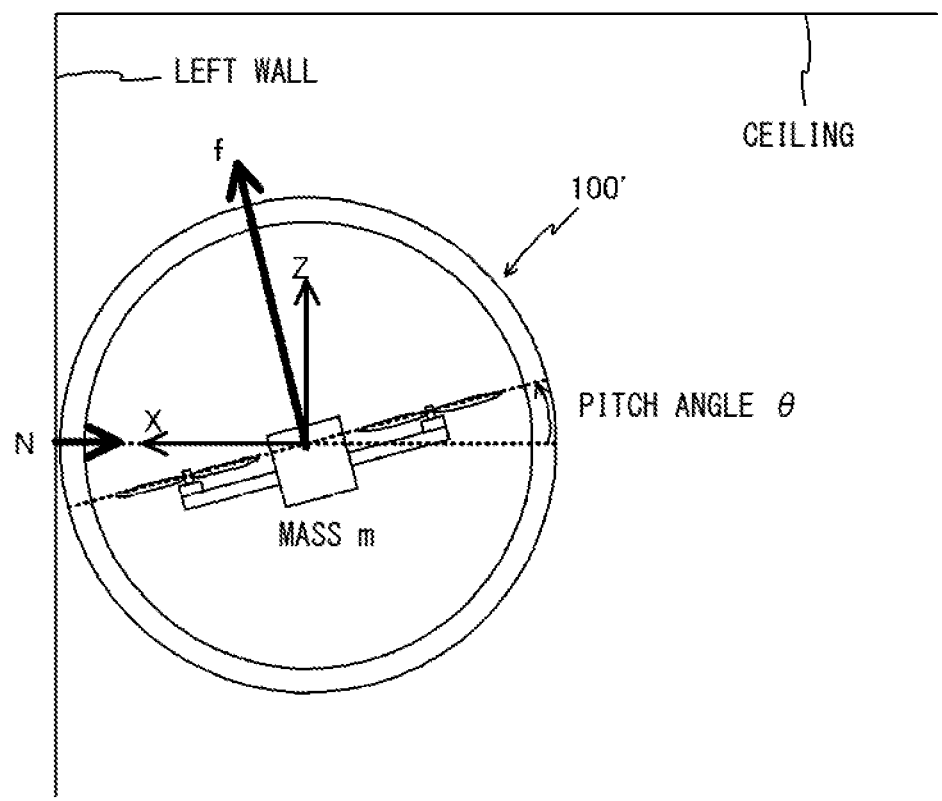
FIG. 15 is a diagram for describing a second estimation method (model base) in accordance with the second embodiment.

A second estimation method estimates the contact state based on a kinetic model. More specifically, the contact state estimation unit 84 calculates a contact force N with the following equation (4) where the mass of the multicopter 100' is represented by m, an operation command (a pitch angle) is represented by θ, an operation command (an amount of throttle) is represented by f, an acceleration is represented by "a", and a force applied by a wall (a contact force) is represented by N as illustrated in FIG. 15.

$$N = f \times \sin\theta - m \times a \quad (4)$$

The contact state estimation unit 84 estimates that the multicopter 100' is in contact with a left wall when the contact force N is greater than 0. A state where the multicopter 100' is in contact with a ceiling or right wall can be estimated in the same manner.

Third Estimation Method (Learning Base)

Figure 16A:
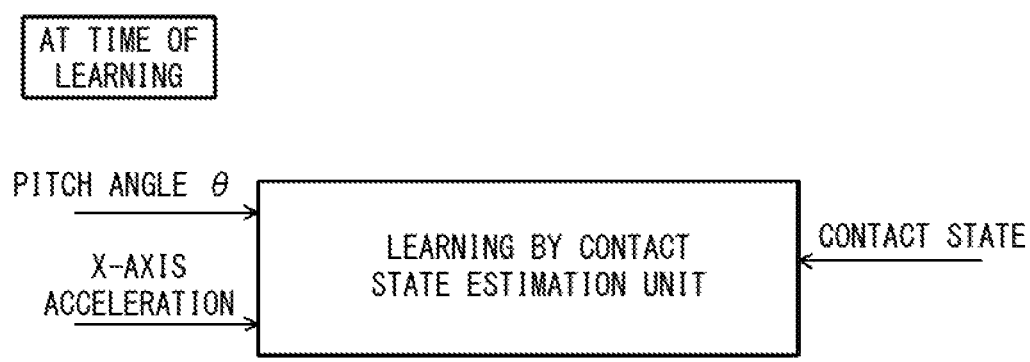
FIG. 16A and FIG. 16B are diagrams for describing a third estimation method (learning base) in accordance with the second embodiment.
Figure 16B:
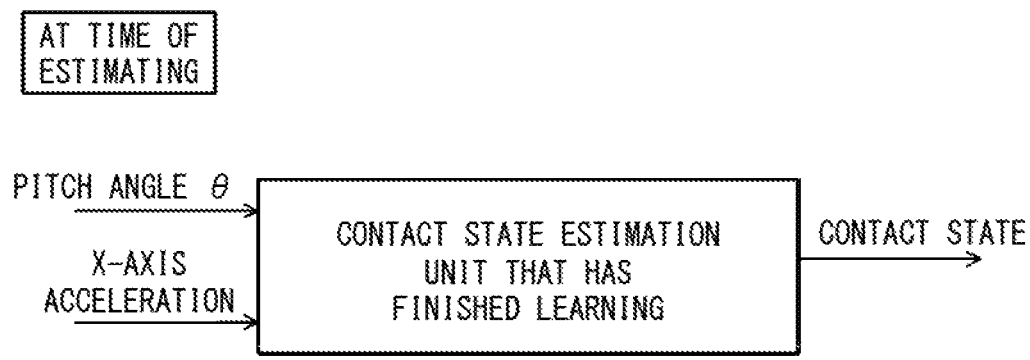

FIG. 16A and FIG. 16B are diagrams for describing a third estimation method. In the third estimation method, as illustrated in FIG. 16A, an operation command (a pitch angle θ), the output of the inertial sensor 76 (an X-axis acceleration), and an actual contact state are preliminarily given and learned. When estimating the contact state, the contact state estimation unit 84 estimates the contact state based on an operation command (a pitch angle θ), the output of the inertial sensor 76 (an X-axis acceleration), and learning results.

As described above, the contact state of the multicopter 100' with a wall or ceiling can be precisely estimated with any one of the first through third estimation methods.

As described in detail above, in the second embodiment, the contact state estimation unit 84 detects contact with a wall or ceiling based on the detection result of the inertial sensor that detects an inertial force acting on the multicopter 100' and the operation command transmitted from the controller device 200. This configuration allows the second embodiment to estimate the contact state with use of the inertial sensor necessary for the flight of the multicopter 100' and preliminarily included in the multicopter 100', reducing the weight of the multicopter and simplifying the structure of the multicopter compared to a case where another sensor is provided to estimate the contact state. In addition, the reduced weight and the simple structure of the multicopter inhibit the reduction of flight time or the decrease in flight stability.

Figure 17:
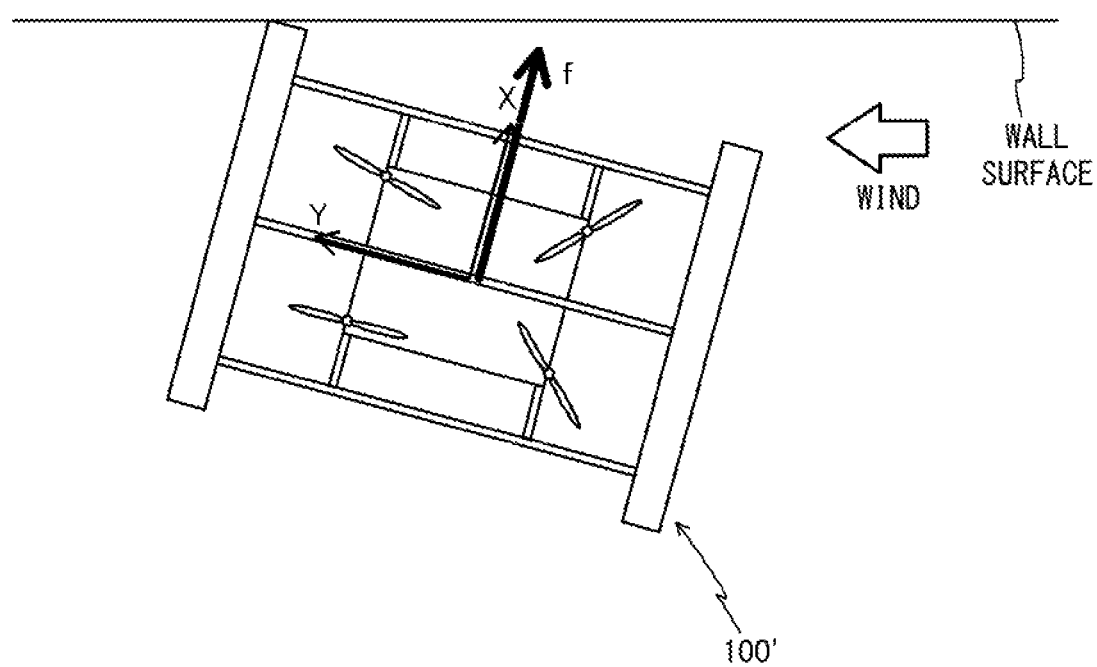
FIG. 17 is a diagram for describing a method of reducing effects of disturbance in the second embodiment.

In the above second embodiment, when the multicopter 100' is in contact with a wall surface (for example, a left wall) (see FIG. 15), the multicopter 100' never rotates around the Z-axis theoretically. However, the multicopter 100' may rotate around the Z-axis due to disturbance such as wind as illustrated in FIG. 17. Thus, when the inertial sensor 76 detects the rotation around the Z-axis, the flight control unit 82 may increase an adhesive force f according to the rotation angle or the rotation speed. This configuration can prevent the contact with the wall from being released by disturbance such as wind.

The structure of the above first embodiment may be employed, and the user may select which of the estimation methods of the contact state of the first embodiment or the second embodiment is used to estimate the contact state. This configuration allows the user to select the estimation method suitable for the situation.

Third Embodiment

A third embodiment will be described based on FIG. 18A through FIG. 20B. A multicopter 100" of the third embodiment is assumed to have the same structure as the multicopter 100 of the first embodiment (here, the structure illustrated in FIG. 8, for example). In the third embodiment, the contact state with a wall or ceiling is determined with use of both the output of the inertial sensor 76 and the output from the contact sensors CS1 through CS8. Hereinafter, a detailed description will be given of the estimation method executed by the contact state estimation unit 84 in the third embodiment.

First Estimation Method (Rule Base)

Figure 18A:
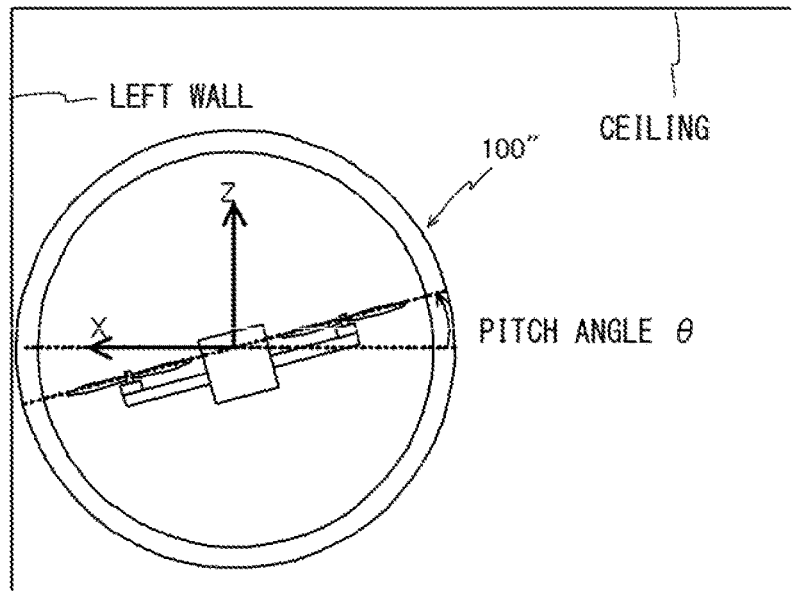
FIG. 18A and FIG. 18B are diagrams for describing the first estimation method (rule base) in accordance with a third embodiment.

The first estimation method estimates the contact state based on an operation command (a pitch angle), the output of the inertial sensor (an angular velocity), and the output of the contact sensors CS1 through CS8. For simplicity's sake, a description will be given of a rule for determining which of states the multicopter 100" is in, a state where the multicopter 100" is in contact with a left wall (a left contact state) as illustrated in FIG. 18A or a state where the multicopter 100" is in contact with a ceiling (an upper contact state).

Figure 18B:
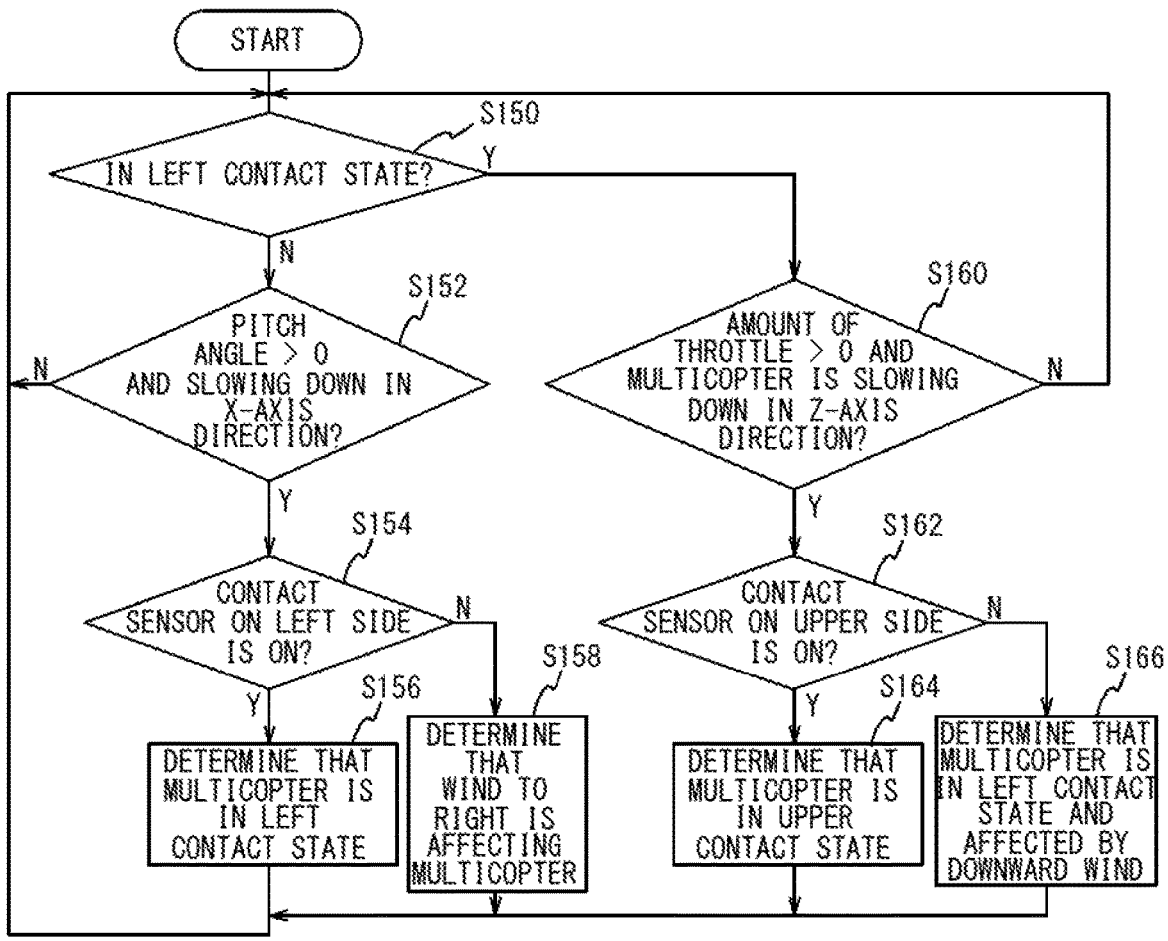

FIG. 18B is a flowchart of processes executed by the contact state estimation unit 84 when a predetermined rule is applied. As illustrated in FIG. 18B, the contact state estimation unit 84 determines whether the multicopter 100" is in the left contact state at step S150. At the initial state, since the multicopter 100" is on the ground and therefore is not in the left contact state, the determination at step S150 is No, and the process moves to step S152.

At step S152, the contact state estimation unit 84 determines whether the pitch angle of the operation command is greater than 0 and whether the output of the inertial sensor 76 indicates that the multicopter 100" is slowing down in the X-axis direction. When the determination at step S152 is Yes, that is, when the thrust force according to the operation command is not being produced although the user is operating the multicopter 100" so that the multicopter 100" moves in the positive direction of the X-axis direction (leftward in FIG. 18A), the process moves to step S154, and the contact state estimation unit 84 determines whether the contact sensor on the left side detects the presence (ON) of contact. The contact sensor on the left side means, for example, at least one of the contact sensors CS1, CS2, and CS8 in FIG. 8. When the determination at step S154 is Yes, the process moves to step S156, and the contact state estimation unit 84 determines that the multicopter 100" is in contact with the left wall (the left contact state). Thereafter, the process returns to step S150.

On the other hand, when the determination at step S152 is No, that is, when the user is operating the multicopter 100" so that the multicopter 100" moves in the X-axis direction and the thrust force according to the operation command is being produced, the process returns to step S150 without executing the contact determination because the multicopter 100" is in contact with nowhere. When the determination at step S154 is No, this means that the output of the inertial sensor 76 is exhibiting the same behavior as the behavior obtained when the multicopter 100" is in contact with the left wall although it can be estimated that the multicopter 100" is not in contact with the left wall based on the output of the contact sensor. In this case, the contact state estimation unit 84 moves to step S158, determines that wind to the right is affecting the multicopter 100", and returns to step S150.

When the process returns to step S150 after the process of step S156, the determination at step S150 becomes Yes. In this case, the process moves to step S160, and the contact state estimation unit 84 determines whether the amount of throttle is greater than 0, and whether the multicopter 100" is slowing down in the Z-axis direction. That is, when the thrust force according to the operation command is not being produced although the user is operating the multicopter 100" so that the multicopter 100" moves in the positive direction of the Z-axis direction (upward in FIG. 14A), the determination at step S160 becomes Yes, and the contact state estimation unit 84 moves to step S162.

At step S162, the contact state estimation unit 84 determines whether the contact sensor on the upper side is detecting the presence (ON) of contact. The contact sensor on the upper side means, for example, at least one of the contact sensors CS2, CS3, and CS4 in FIG. 8. When the determination at step S162 is Yes, the process moves to step S164, and the contact state estimation unit 84 determines that the multicopter 100" is in contact with a ceiling (the upper contact state). Thereafter, the process returns to step S150.

On the other hand, when the determination at step S160 is No, that is, when the user is operating the multicopter 100" so that the multicopter 100" moves in the Z-axis direction and the thrust force according to the operation command is being produced, the contact state estimation unit 84 returns to step S150 because it is estimated that the multicopter 100" is not in contact with a ceiling and maintains the left contact state. When the determination at step S162 is No, this means that the output of the inertial sensor 76 is exhibiting the same behavior as the behavior obtained when the multicopter 100" is in contact with a ceiling although it can be estimated that the multicopter 100" is not in contact with a ceiling based on the output of the contact sensor. In this case, the contact state estimation unit 84 moves to step S166, determines that the multicopter 100" is being affected by downward wind while maintaining the left contact state, and returns to step S150.

The repetition of the above processes enables to precisely estimate which of the left contact state or the upper contact state the multicopter 100" is in based on the output of the inertial sensor 76 and the output of the contact sensors CS1 through CS8.

Second Estimation Method (Learning Base)

Figure 19A:
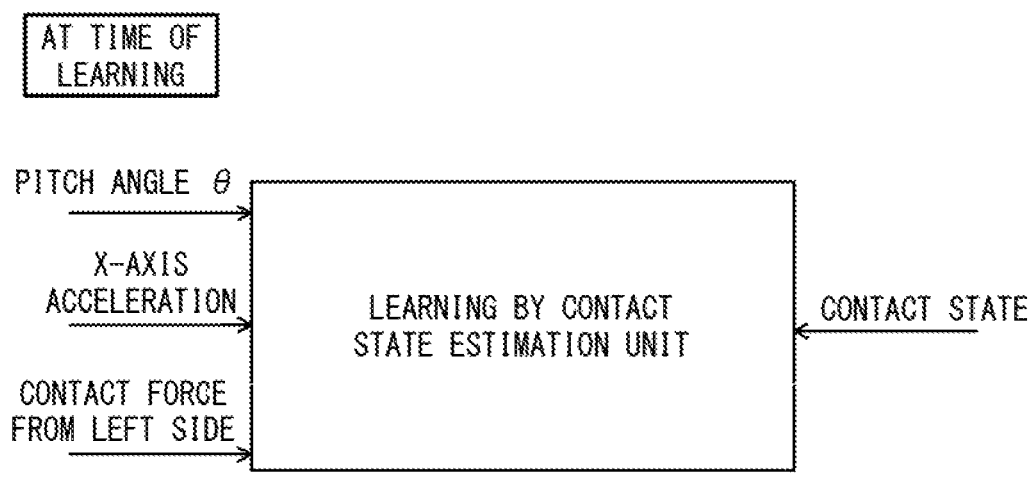
FIG. 19A and FIG. 19B are diagrams for describing the second estimation method (learning base) in accordance with the third embodiment.
Figure 19B:
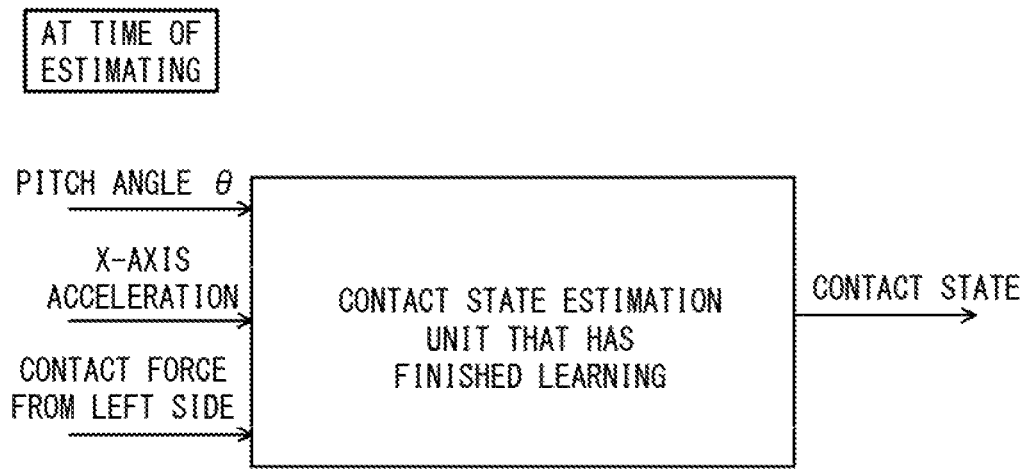

FIG. 19A and FIG. 19B are diagrams for describing the second estimation method. When the second estimation method is applied, the multicopter 100" is assumed to employ the structure of FIG. 8 and include force sensors as the contact sensors CS1 through CS8 (contact sensors capable of detecting a contact force).

In the second estimation method, as illustrated in FIG. 19A, an operation command (a pitch angle θ), the output of the inertial sensor 76 (an X-axis acceleration), a contact force (N) from the left side calculated based on the output of the contact sensors CS1 through CS8, and an actual contact state are preliminarily given and learned. The contact force from the left side means the estimated contact force (see FIG. 11) calculated by the equation (2) of the variation of the first embodiment.

When estimating the contact state, the contact state estimation unit 84 estimates the contact state based on the operation command (a pitch angle θ), the output of the inertial sensor 76 (an X-axis acceleration), the contact force (N) from the left side, and learning results.

Such a configuration also enables to precisely estimate the contact state.

Estimation Method of Separation Angle

Figure 20A:
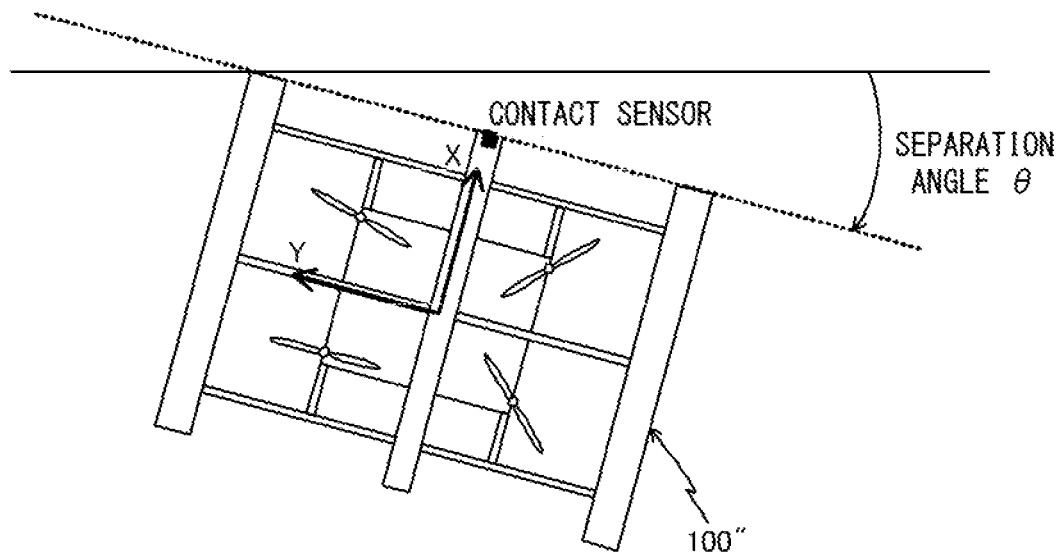
FIG. 20A and FIG. 20B are diagrams for describing a method of estimating a separation angle in the third embodiment.

The third embodiment is assumed to use the output of the contact sensors CS1 through CS8 and the output of the inertial sensor 76. Thus, as illustrated in FIG. 20A, even when the multicopter 100" that has been in contact with a wall surface rotates (when one of the wheels 34 separates from a wall), a separation angle θ can be estimated by processes illustrated in FIG. 20B. The process of FIG. 20B is started from the state where the multicopter 100" is in contact with a wall surface (the state where one of the contact sensors CS1 through CS8 outputs an ON signal).

Figure 20B:
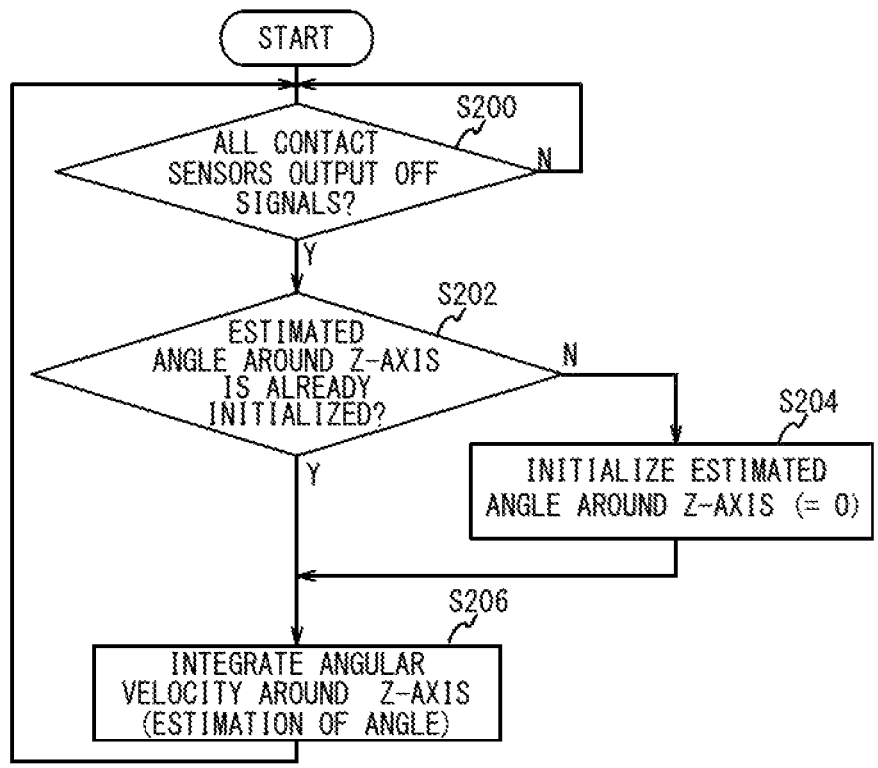

In the process of FIG. 20B, at step S200, the contact state estimation unit 84 waits until all the contact sensors CS1 through CS8 output OFF signals. When all the contact sensors CS1 through CS8 output OFF signals, the contact state estimation unit 84 moves to step S202, and determines whether the estimated angle around the Z-axis is already initialized. When the determination at step S202 is No, the process moves to step S204, and the contact state estimation unit 84 initializes the estimated angle around the Z-axis (=0), and moves to step S206.

On the other hand, when the determination at step S202 is Yes, the process directly moves to step S206. At step S206, the contact state estimation unit 84 integrates the angular velocity around the Z-axis, and estimates the angle that the multicopter 100" has rotated around the Z-axis before now. Thereafter, the process returns to step S200.

In the process of FIG. 20B, the repeated execution of step S206 allows for the appropriate estimation of the rotation angle of the multicopter 100".

As described in detail above, the third embodiment estimates the contact state of the multicopter 100" by using the output of the inertial sensor 76 and the output of the contact sensors CS1 through CS8, and therefore can precisely estimate the contact state taking into account the effect of disturbance such as wind.

The above-described processing functions are implemented by a computer. In this case, a program in which processing details of the functions that a processing device (CPU) is to have are written are provided. The execution of the program by the computer allows the computer to implement the above described processing functions. The program in which the processing details are written can be stored in a storage medium (however, excluding carrier waves) capable of being read by a computer.

When the program is distributed, it may be sold in the form of a portable storage medium such as a Digital Versatile Disc (DVD) or a Compact Disc Read Only Memory (CD-ROM) storing the program. The program may be stored in a storage device of a server computer, and the program may be transferred from the server computer to another computer over a network.

A computer executing the program stores the program stored in a portable storage medium or transferred from a server computer in its own storage device. The computer then reads the program from its own storage device, and executes a process according to the program. The computer may directly read the program from a portable storage medium, and execute a process according to the program. Alternatively, the computer may successively execute a process, every time the program is transferred from a server computer, according to the received program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. An unmanned aerial vehicle configured to communicate with a controller device operated by a user, the unmanned aerial vehicle comprising:

a memory;

a processor coupled to the memory and configured to:

determine whether the unmanned aerial vehicle is in contact with an object based on a signal from a contact detector, and move the unmanned aerial vehicle in a direction corresponding to a first operation command transmitted from the controller device while causing a thrust force to be produced so that a contact between the object and the unmanned aerial vehicle is maintained when it is determined that the unmanned aerial vehicle is in contact with the object;

a main body including a rotor;

a frame fixed to the main body and surrounding a whole of the main body; and a plurality of wheels rotatably supported by the frame, wherein the contact detector includes an inertial sensor that detects an inertial force acting on the unmanned aerial vehicle, and the processor is configured to determine whether the unmanned aerial vehicle is in contact with the object based on a second operation command transmitted from the controller device and a detection result of the inertial sensor, the second operation command being an operation command transmitted before the unmanned aerial vehicle is moved in the direction corresponding to the first operation command.

2. A non-transitory computer-readable storage medium storing a program causing a computer to execute a process for controlling an unmanned aerial vehicle configured to communicate with a controller device operated by a user, the process comprising:

determining whether the unmanned aerial vehicle is in contact with an object based on a signal from a contact detector; and moving the unmanned aerial vehicle in a direction corresponding to a first operation command transmitted from the controller device while a thrust force is produced so that contact between the object and the unmanned aerial vehicle is maintained when it is determined that the unmanned aerial vehicle is in contact with the object, wherein the contact detector includes an inertial sensor that detects an inertial force acting on the unmanned aerial vehicle, and the determining includes determining whether the unmanned aerial vehicle is in contact with the object based on a second operation command transmitted from the controller device and a detection result of the inertial sensor, the second operation command being an operation command transmitted before the unmanned aerial vehicle is moved in the direction corresponding to the first operation command.

3. A control method executed by a processor of an unmanned aerial vehicle, the unmanned aerial vehicle being configured to communicate with a controller device operated by a user, the control method comprising:

determining whether the unmanned aerial vehicle is in contact with an object based on a signal from a contact detector; and moving the unmanned aerial vehicle in a direction corresponding to a first operation command transmitted from the controller device while a thrust force is produced so that contact between the object and the unmanned aerial vehicle is maintained when it is determined that the unmanned aerial vehicle is in contact with the object, wherein the contact detector includes an inertial sensor that detects an inertial force acting on the unmanned aerial vehicle, and the determining includes determining whether the unmanned aerial vehicle is in contact with the object based on a second operation command transmitted from the controller device and a detection result of the inertial sensor, the second operation command being an operation command transmitted before the unmanned aerial vehicle is moved in the direction corresponding to the first operation command.

4. An unmanned aerial vehicle configured to communicate with a controller device operated by a user, the unmanned aerial vehicle comprising:

a memory; and a processor coupled to the memory and configured to:

determine whether the unmanned aerial vehicle is in contact with an object based on a signal from a contact detector, and move the unmanned aerial vehicle in a direction corresponding to a first operation command transmitted from the controller device while causing a thrust force to be produced so that a contact between the object and the unmanned aerial vehicle is maintained when it is determined that the unmanned aerial vehicle is in contact with the object, wherein the contact detector includes an inertial sensor that detects an inertial force acting on the unmanned aerial vehicle, and the processor is configured to determine whether the unmanned aerial vehicle is in contact with the object based on a second operation command transmitted from the controller device and a detection result of the inertial sensor, the second operation command being an operation command transmitted before the unmanned aerial vehicle is moved in the direction corresponding to the first operation command.

* * * * *